(12) United States Patent
Takeda et al.

(10) Patent No.: US 8,571,166 B2
(45) Date of Patent: Oct. 29, 2013

(54) CORE OF LIGHT WATER REACTOR AND FUEL ASSEMBLY

(75) Inventors: Renzo Takeda, Kawasaki (JP); Junichi Miwa, Mito (JP); Kumiaki Moriya, Hitachi (JP)

(73) Assignee: Hitachi-GE Nuclear Energy, Ltd., Ibaraki (JP)

( * ) Notice: Subject to any disclaimer, the term of this patent is extended or adjusted under 35 U.S.C. 154(b) by 0 days.

(21) Appl. No.: 13/411,091

(22) Filed: Mar. 2, 2012

(65) Prior Publication Data

US 2012/0177169 A1 Jul. 12, 2012

(30) Foreign Application Priority Data

Aug. 8, 2008 (JP) .................................. 2008-205061

(51) Int. Cl.
*G21C 3/00* (2006.01)
(52) U.S. Cl.
USPC ............ 376/409; 376/347; 376/412; 376/416
(58) Field of Classification Search
USPC .................. 376/347, 409, 412, 416, 432, 433
See application file for complete search history.

(56) References Cited

U.S. PATENT DOCUMENTS

| 5,812,621 | A | 9/1998 | Takeda et al. | |
|---|---|---|---|---|
| 6,512,805 | B1 * | 1/2003 | Takeda et al. | 376/171 |

FOREIGN PATENT DOCUMENTS

| JP | 5-312981 | 11/1993 |
|---|---|---|
| JP | 6-66978 | 3/1994 |
| JP | 08-021890 | 1/1996 |
| JP | 3428150 | 5/2003 |
| JP | 2003-222694 | 8/2003 |
| JP | 2008-032467 | 2/2008 |
| JP | 2008-215818 | 9/2008 |

OTHER PUBLICATIONS

R. Takeda et al., "BWRS for long-term energy supply and for fissioning almost all transuraniums", Proc. of International Conference on Advanced Nuclear Fuel Cycles and Systems. GLOBAL '07 Boise, USA, Sep. 2007, p. 1725.*
R. Takeda et al., "General Features of Resource-Renewable BWR (RBWR) and Scenario of Long-term Energy Supply", Proc. of International Conference on Evaluation of Emerging Nuclear Fuel Cycle Systems. GLOBAL '95 Versailles, France, Sep. 1995, p. 938.
G. A. Ducat et al., "Evaluation of the Parfait Blanket Concept for Fast Breeder Reactors", MITNE-157, Jan. 1974.
R. Takeda at al., "BWRS for long-term energy supply and for fissioning almost all transuraniums", Proc. of International Conference on Advanced Nuclear Fuel Cycles and Systems. GLOBAL '07 Boise, USA, Sep. 2007, p. 1725.

* cited by examiner

*Primary Examiner* — Jack W. Keith
*Assistant Examiner* — Marshall O'Connor
(74) *Attorney, Agent, or Firm* — Antonelli, Terry, Stout & Kraus, LLP.

(57) ABSTRACT

A core of a light water reactor having a plurality of fuel assemblies, which are loaded in said core, having nuclear fuel material containing a plurality of isotopes of transuranium nuclides, an upper blanket zone, a lower blanket zone, and a fissile zone, in which the transuranium nuclides are contained, disposed between the upper blanket zone and the lower blanket zone, wherein a ratio of Pu-239 in all the transuranium nuclides contained in the loaded fuel assembly is in a range of 40 to 60% when burnup of the fuel assembly is 0, sum of a height of the lower blanket zone and a height of the upper blanket zone is in a range of 250 to 600 mm, and the height of said lower blanket zone is in a range of 1.6 to 12 times the height of the upper blanket zone.

5 Claims, 25 Drawing Sheets

◯ FRESH FUEL ASSEMBLY 1A
▨ ONCE-BURNED FUEL ASSEMBLY 1B
⊞ TWICH-BURNED FUEL ASSEMBLY 1C
▩ THREE-TIMES BURNED FUEL ASSEMBLY 1D
⊞ FOUR-TIMES BURNED FUEL ASSEMBLY 1E

◯ INNER REGION
⬡ OUTERMOST PERIPHERAL REGION

○ 10.7wt%   ◍ 13.5wt%
● 16.8wt%   ⊕ 18.2wt%
⋯ 19.5wt%

○ FRESH FUEL ASSEMBLY 1A
▨ ONCE-BURNED FUEL ASSEMBLY 1B
⬢ TWICH-BURNED FUEL ASSEMBLY 1C
⬣ THREE-TIMES BURNED FUEL ASSEMBLY 1D

○ FRESH FUEL ASSEMBLY 1A
▨ ONCE-BURNED FUEL ASSEMBLY 1B
▧ TWICH-BURNED FUEL ASSEMBLY 1C
▦ THREE-TIMES BURNED FUEL ASSEMBLY 1D

CORE OF LIGHT WATER REACTOR AND FUEL ASSEMBLY

CROSS REFERENCE TO RELATED APPLICATION

This application is a divisional application of U.S. Application Serial No. 12/537,452, filed Aug. 7, 2009, the contents of which are incorporated herein by reference.

CLAIM OF PRIORITY

The present application claims priority from Japanese Patent application serial no. 2008-205061, filed on Aug. 8, 2008, the content of which is hereby incorporated by reference into this application.

BACKGROUND OF THE INVENTION

The present invention relates to a core of a light water reactor and a fuel assembly, and more particularly, to a core of a light water reactor and a fuel assembly suitable for a boiling water reactor.

When actinide nuclide, which has many isotopes and is included in a nuclear fuel material in a fuel assembly loaded in a core of a light water reactor, burns in a core, the actinide nuclide to transfers among isotopes in succession by nuclear transmutation such as nuclear fission and neutron absorption. Since odd-numbered nucleus that has a large nuclear fission cross section with respect to a resonance and thermal neutrons, and even-numbered nucleus that undergoes fission only for fast neutrons are present as the actinide nuclide, in general, present ratios of the isotopes present in the actinide nuclides included in the fuel assembly largely change as the actinide nuclides burn. It is known that this present ratio change depends on the neutron energy spectrum at the position at which the fuel assembly is loaded in the core.

Current light water rectors use slightly enriched uranium as nuclear fuel. However, since the natural uranium resource is finite, it is necessary to successively replace fuel assemblies used in the light water reactor with recycled fuel assemblies including a nuclear fuel material which is formed by enriching depleted uranium, which is a residual after uranium enrichment, with the transuranic nuclide (hereinafter referred to as TRU) extracted from spent fuel assemblies in the light water reactor. TRU needs to be recycled as a useful resource over a very long period predicted to be necessary for commercial reactors, and during this period, the amount of TRU needs to always increase or to be maintained nearly constant. JP 3428150 B describes technology to implement a breeder reactor in which the amount of fissionable Pu is increased or maintained nearly constant in light water reactors that occupy most of the current commercial reactors. In a light water reactor in which the breeder reactor described in JP 3428150 B and R. TAKEDA et al., Proc. of International Conference on Evaluation of Emerging Nuclear Fuel Cycle Systems. GLOBAL '95 Versailles, France, September, 1995, P. 938 is became a reality, a plurality of fuel assemblies, each of which has a hexagonal transverse cross section, are disposed in the core, each fuel assembly being formed by closely arranging a plurality of fuel rods in a triangular grid. In the core of this light water reactor, the amount of water around the fuel rods is lessened due to the close arrangement of the fuel rods, and thereby the ratios of resonant energy neutrons and fast energy neutrons are increased. In addition, the height of a mixed oxide fuel section of the TRU is reduced and blanket zones loaded with depleted uranium are disposed above and below the mixed oxide burning part so as to maintain a negative void coefficient, which is a safety criterion. The core is formed in two stacked stages by applying the concept of a parfait-type core described in G. A. Ducat et al., Evaluation of the Parfait Blanket Concept for Fast Breeder Reactors, MITNE-157, January, 1974, thereby a breeding ratio of 1 or more is ensure, keeping the economy.

To recycle TRU, the reprocessing of spent fuel is indispensable. Due to a fear that consumer TRU is diverted to weapons of mass destruction, there has been an increasing demand for nuclear non-proliferation and thereby restrictions on TRU recycling have been severe.

It is certain that an electric power generating system superior to a fission reactor is put into practical use on some day in the future. At that time, the value of TRU is lowered from a very useful fuel equivalent to enriched uranium to is a cumbersome long-lived waste material. Accordingly, the most important object in nuclear power development is to establish a TRU disposal method.

R. TAKEDA et al., Proc. of International Conference on Advanced Nuclear Fuel Cycles and Systems. GLOBAL '07 Boise, USA, September, 2007, P. 1725 suggests a TRU disappearance reactor and a light water breeder reactor for recycling TRU while the present ratio of each isotope of the TRU is maintained nearly constant to achieve multiple recycling, in which recycling, the TRU obtained by reprocessing a spent nuclear fuel is reused as a new nuclear fuel to repeat recycling. This light water breeder reactor can recycle in a state in which the amount of TRU is maintained constant or increased, and it has a core loaded with fuel assemblies with a high burnup and high nuclear proliferation resistance. The TRU disappearance reactor is a reactor for reducing TRU through nuclear fission by successively reducing and aggregating the TRU until all the TRU is reduced by undergoing fission to the amount of the TRU being loaded in the last one core to prevent the TRU from becoming a long-life radioactive waste at the end of the light water reactor's purpose.

SUMMARY OF THE INVENTION

A light water reactor for recycling TRU was achieved in R. TAKEDA et al., Proc. of International Conference on Evaluation of Emerging Nuclear Fuel Cycle Systems. GLOBAL '95 Versailles, France, September, 1995, P. 938; such that a recycle reactor effectively uses a seed fuel, in which the amount of TRU is maintained constant, with a sufficient safety margin to meet design standards for abnormal transience and accidents; and that the recycle reactor can stabilize supply of energy for a long period of time by burning all depleted uranium, and by making all the TRU undergo fission, the recycle reactor prevents the TRU from becoming a long-life radioactive waste at the end of the nuclear fission reactor's purpose when the TRU has become no longer necessary. On the other hand, there has recently been a movement to tighten up the attitude toward safety; consequently, a core having a high safety potential is expected, having a sufficient safety margin for responding to an accident outside the design standards (Anticipated Transient Without Scram, or ATWS) such as, for example, a compound event where the core flow rate suddenly drops for some reason and all control rods cannot be inserted into the core.

An object of the present invention is to provide a core of a light water reactor and a fuel assembly which can further increases a safety margin without sacrificing an economic efficiency of the light water reactor.

The present invention for attaining the above object is characterized in that, in a fuel assembly, which was loaded in a core, with a burnup of 0, a ratio of Pu-239 in all transuranium nuclides included in the fuel assembly is in a range of 40 to 60%, sum of heights of a lower blanket zone and an upper blanket zone formed in the core is in a range of 250 to 600 mm, and the height of the lower blanket zone is in a range of 1.6 to 12 times the height of the upper blanket zone.

According to the present invention, a safety margin can be sufficiently maintained even with the occurrence of a compound event, in which core flow rate is suddenly dropped for some reason and all control rods cannot be inserted into the core at the same time during the operation of the light water reactor, beyond design standards. When such a compound event occurs, void fraction in the core rapidly increases, a boiling start point of coolant being slightly sub-cooled, being supplied into the core from below the core, shifts toward a lower end of the core, and the power distribution in the axial direction of the core also shifts toward the lower end of the core. Therefore, excess neutrons are shifted toward the lower end of the core. These shifted excess neutrons can be absorbed by neutron absorber in a neutron absorber filling-zone, an upper end of which is positioned in the vicinity of the lower end of the core, of a safety rod. As a result, power of the light water reactor can be automatically reduced to the power at which the fuel assemblies in the core can be cooled by the capacity of the coolant suppliable from an emergency high-pressure core flooder. Thus, a sufficient safety potential can be maintained upon the occurrence of a compound event beyond the design standards. In this way, the present invention can improve the safety margin without sacrificing the economic efficiency of the light water reactor even with the occurrence of the compound event.

The above object can also be achieved when, in a fuel assembly, which was loaded in a core, with a burnup of 0, a ratio of Pu-239 in all transuranium nuclides included in the fuel assembly is at least 5% but less than 40%, a height of an upper blanket zone is in a range of 20 to 100 mm, and a lower end of a fissile zone matches a lower end of the core.

According to the present invention, a safety margin can be further increased without sacrificing an economic efficiency of a light water reactor.

DETAILED DESCRIPTION OF THE PREFERRED EMBODIMENTS

Figure 1:
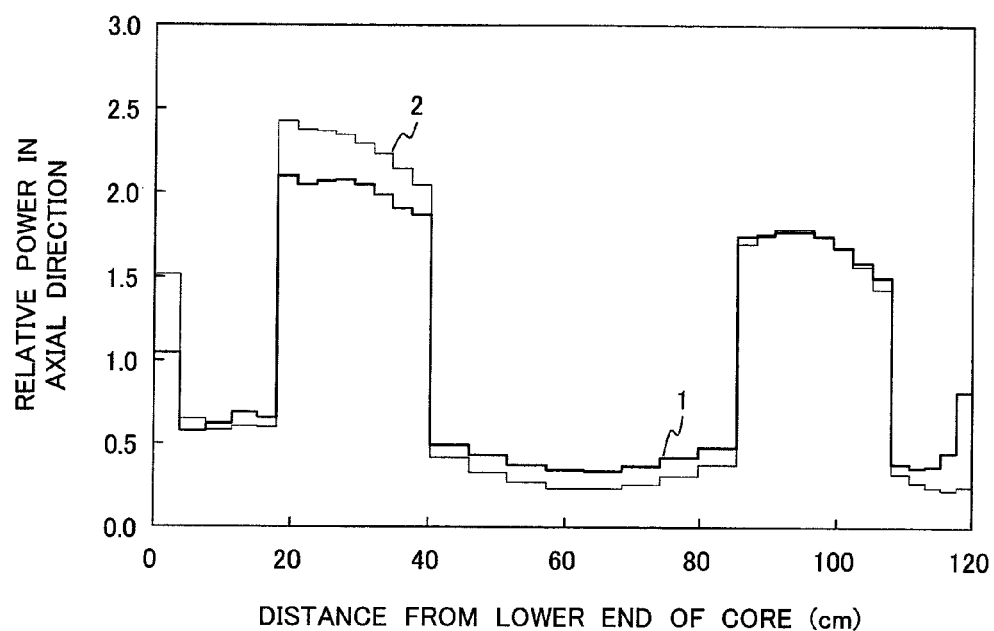
FIG. 1 is an explanatory drawing showing an average power distribution in an axial direction of a core in a core having a fissile Pu breeding ratio of 1.01 during its rated power operation, and an average power distribution in the axial direction of the core when a core flow rate is dropped to 4 kt/h which is a flow rate of coolant suppliable by an emergency high-pressure flooder.

Cooling water (coolant) for cooling fuel assemblies in a core of a BWR is supplied into a core from below as sub-cooled water at approximately 10° C., and as cooling the fuel assemblies, it becomes a two-phase flow including saturated water and steam-and-water. This cooling water becomes a two-phase flow with a void volume fraction of approximately 60 to 80% at an outlet of the core. Thus, a distribution of hydrogen atoms, which significantly contribute to moderate neutrons, in the axial direction of the core decreases from the lower portion toward the upper portion of the core. For this reason, if the fuel assemblies having one zone of axial enrichment distribution are loaded into the core of the BWR, a large power peak is formed in the lower region of the core. When the flow rate of the cooling water in the core is reduced for some reason, the boiling start point of the cooling water is shifted further downward than that of when the reactor is operated at its rated power and rated core flow rate, and the power peak is shifted further downward in the core as well.

The inventors have thoroughly considered the above characteristics of a core of a BWR and found out that, in a core of a light water reactor loaded with a plurality of fuel assemblies including nuclear fuel material obtained by reprocessing, the ratio of Pu-239 in all TRU included in fuel assemblies at the time of zero burnup is in a range of 40 to 60%, when an upper end of a neutron absorber filling-zone of a control rod is disposed in the vicinity of a lower end of the core, a safety margin can be further increased without sacrificing the economic efficiency of the light water reactor by applying any of the following constitutions, i.e., (1) making the sum of the heights of an upper blanket zone and a lower blanket zone in the core in a range of 250 to 600 mm and at the same time, making the height of the lower blanket zone in a range of 1.6 to 12 times that of the upper blanket zone, (2) making the height of the lower blanket zone higher than that of the upper blanket zone and at the same time, making the height of the upper blanket zone in a range of 30 to 105 mm, and (3) making the height of the lower blanket zone higher than that of the upper blanket zone and at the same time, making the height of an upper fissile zone including Pu for the core higher than the height of a lower fissile zone including Pu within a range of 10 to 25 mm. In other words, by applying any of the constitutions (1), (2), and (3), even with the occurrence of a compound event, which is beyond design standards, such as the coolant in the core is lost for some reason and all the control rods cannot be into the core for some reason, excess neutrons in the core are automatically absorbed by the neutron absorber disposed in the lower end of the core, because a void fraction in the core is rapidly increased when the flow rate of the coolant supplied to the core (a core flow rate) is suddenly decreased, and the power distribution in the axial direction of the core is shifted toward the lower end of the core. For this reason, reactor power is automatically reduced to the reactor power at which cooling can be achieved by the flow rate of the coolant supplied to the core by an emergency high-pressure core flooder that is automatically activated in the case of an emergency. As described above, the inventors have newly found out that a safety potential in a core of a light water reactor can be enhanced by applying any of the constitutions (1), (2), and (3). In addition, the inventors have found out that the safety margin can also be increased, as done in above, by (4) making the height of the lower blanket zone higher than that of the upper blanket zone and at the same time, disposing neutron absorbing material to the position where excess neutrons generated at the time of the accident gather.

The safety margin can be further improved by combining some of the constitutions (1), (2), (3), and (4). For example, when the constitutions (1) and (2) are combined, the safety margin will be larger than that of the constitution (1) alone; and when the constitution (3) is additionally combined to the combination of the constitutions (1) and (2), the safety margin will be further improved than that of the constitutions (1) and (2) combined. This can be said to the other combinations in which the constitution (2), (3), or (4) is combined to other two constitutions. When (4) is additionally combined to the combination of the constitutions (1), (2), and (3), the safety margin will be the largest among the combinations including some of the constitutions (1) to (4).

Furthermore, the inventors have newly found out that, in a core of a light water reactor loaded with a plurality of fuel assemblies including nuclear fuel material obtained by reprocessing, the ratio of Pu-239 in all TRU included in fuel assemblies at the time of zero burnup is at least 5% but less than 40%, when the upper end of a neutron absorber filling-zone of a control rod is disposed in the vicinity of the lower end of the core, a safety margin can be further increased without sacrificing economic efficiency and design target performance of TRU multi-recycling by applying any of the following constitutions, i.e., (5) matching a lower end of a fissile zone in the core to the lower end of the core and at the same time, making the height of an upper blanket zone in a range of 20 to 100 mm, and (6) having the upper blanket zone and at the same time, making a height of an upper fissile zone in the core higher than a height of a lower fissile zone within a range of 10 to 25 mm. The safety margin is further improved by combining the constitution (6) to the constitution (5) compared to the light water reactor core having either constitution (5) or (6) alone.

A goal of the present invention is to improve safety of a recycling-type light water reactor which utilizes nuclear fuel material containing TRU obtained by reprocessing. Such present invention is made to maintain safety even with the occurrence of multiple accidents beyond design standards and to allow TRU multi-recycling to continue, when the performance as a breeder reactor (a light water breeder reactor) is to be improved in the light water reactor shown in JP 3428150 B, and when the TRU considered to be disposed of as a long-life radioactive waste when it is no longer necessary, is to be utilized as nuclear fuel material until all the TRU, except for those being loaded in the last one core, are made to undergo fission.

A reactor core of a light water reactor having improved performance as a breeder reactor is described. For example, a light water breeder reactor that yields a fissile Pu residual rate of 1 or more in a BWR was first achieved in JP 3428150B. To realize the breeder reactor in a light water reactor, neutron energy in the core must be maintained at a high level. However, since the mass of a hydrogen atom forming the water used as a coolant in the light water reactor is small compared to that of Na generally used as a coolant in a breeder reactor, the energy loss of neutrons at one collision becomes large in the light water reactor. Thus, it is necessary to reduce a ratio of coolant per unit volume of nuclear fuel material in the light water reactor. When a nuclear fuel material having a ratio of Pu-239 in all TRU in a range of more than 60% is recycled, the following problems may arise, i.e., (a) a capacity for cooling the nuclear fuel material in the core is not enough, (b) a burnup of the fuel assemblies is reduced, impairing the economic efficiency of the fuel, and (c) a gap between fuel rods disposed in the fuel assembly become too narrow, causing the production of the fuel assembly to be difficult. When a nuclear fuel material having a ratio of Pu-239 in all TRU in a range of less than 40% is recycled, the following problems may arise, i.e., (d) a ratio of odd-numbered nuclides having a larger nuclear fission cross section is reduced compared to that of even-numbered nuclides having a smaller nuclear fission cross section, causing a fissile Pu residual rate of 1 or more to be difficult to attain, and (e) the core becomes large and the void coefficient, which is a safety indicator, is worsened. Therefore, in a light water breeder reactor, the ratio of Pu-239 contained in all the TRU should be within a range of 40 to 60%.

Next described is a reactor core of a light water reactor (a TRU disappearance reactor) which allows the TRU being considered to be disposed of as a long-life radioactive waste when it is no longer necessary, to be utilized as nuclear fuel material until all the TRU except for those being loaded in the last one core is made to undergo fission. The inventors have thought out to reduce the TRU by nuclear fission when the TRU is no longer needed, by integrating the TRU dispersed in many cores based on the amount of reduction of TRU, and leaving the TRU only in one core at the end. At this time, when a nuclear fuel material having a ratio of Pu-239 in all the TRU in a range of at least 40% is recycled to prevent the TRU from becoming a long-life radioactive waste, it takes too long to integrate the TRU in one core since the speed of the TRU reduction is slow. When a nuclear fuel material having a ratio of Pu-239 in all the TRU in a range of less than 5% is used for recycling, the core becomes large and the void coefficient is worsened. Therefore, in a TRU disappearance reactor, the ratio of Pu-239 contained in all the TRU should be set to a range of at least 5% but less than 40%.

Now, an overview of a parfait-type reactor core is described. The parfait-type reactor core uses a fuel assembly having a lower blanket zone, a lower fissile zone, an inner blanket zone, an upper fissile zone, and an upper blanket zone disposed in this order from the lower end portion to the upper end portion, as a new fuel assembly (having a burnup of 0) for loading. In the parfait-type reactor core, a lower blanket zone, a lower fissile zone, an inner blanket zone, an upper fissile zone, and an upper blanket zone are formed from the lower end portion to the upper end portion as well. The lower and upper fissile zones include TRU oxide fuel (or mixed oxide fuel of TRU oxide and uranium oxide).

The present invention is intended for the above recycling-type light water reactor and the light water reactor core. The results of study done by the inventors are described below.

First of all, the results of the study by the inventors regarding a core of a light water breeder reactor are described below. In the description, a BWR core with an electric power of 1350 MW and a breeding ratio of 1.01, loaded with 720 fuel assemblies, each of which having 271 fuel rods, in the core is used as an example of the core of the light water breeder reactor.

While the cores disclosed in JP 3428150 B; R. TAKEDA et al., Proc. of International Conference on Evaluation of Emerging Nuclear Fuel Cycle Systems. GLOBAL '95 Versailles, France, September, 1995, P. 938; and R. TAKEDA et al., Proc. of International Conference on Advanced Nuclear Fuel Cycles and Systems. GLOBAL '07 Boise, USA, September, 2007, P. 1725 can safely and sufficiently respond to abnormal transience and accidents within design standards, this BWR core cannot always respond in a sufficient manner upon the occurrence of a compound event such as the core flow rate being suddenly decreased for some reason and in addition, all control rods being inoperable, when such an event is currently regarded as beyond the design standards. In some cases, TRU recycling may have to be stopped in the middle. In other words, multiple recycling may not be continued.

In order to continue TRU recycling while maintaining a sufficient safety potential in the above BWR core, the void coefficient must be maintained within to a predetermined range. The inventors have studied a method to improve a safety margin for the core of the light water reactor which has the lower and upper blanket zones, is loaded with a plurality of fuel assemblies including nuclear fuel material obtained by reprocessing. In each of these fuel assemblies, the ratio of Pu-239 in all TRU included in the fuel assembly at the time of zero burnup is in a range of 40 to 60%. As a result of the study, the inventors have newly found out a way to realize TRU multi-recycling such that, when the core flow rate is suddenly dropped for some reason specific to the function of the BWR, the void fraction in the core rapidly rises and the boiling start point of the coolant being slightly sub-cooled and flowing into the core from below, shifts to the lower end side of the core, which makes the power distribution in the axial direction of the core shift to the lower end side of the core; thus, by disposing neutron absorbing material in the vicinity of the lower end of the core, a sufficient safety potential can be maintained upon the occurrence of multiple accidents. Based on this knowledge, the inventors have newly found out that the safety potential can be enhanced while the breeding ratio of the TRU is maintained by adapting any of the above (1), (2), (3), and (4). In the core of the light water reactor discussed here, the control rods are inserted into the core from below.

Figure 2:
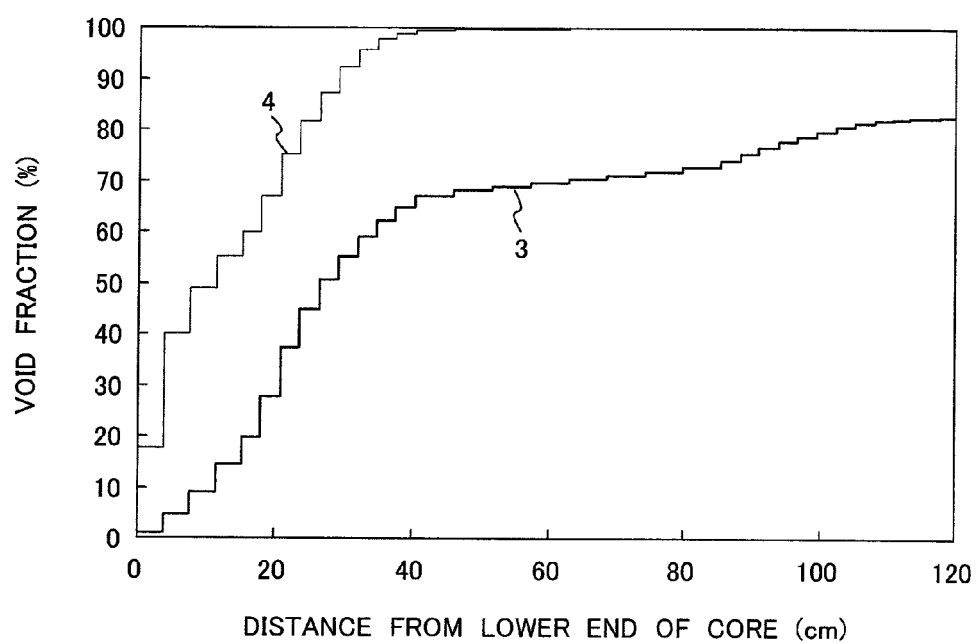
FIG. 2 is an explanatory drawing showing a void fraction distribution in an axial direction of a core in the core having a fissile Pu breeding ratio of 1.01 during its rated power operation, and a void fraction distribution in an axial direction of the core when a core flow rate is dropped to 4 kt/h which is a flow rate of coolant suppliable by an emergency high-pressure flooder.
Figure 3:
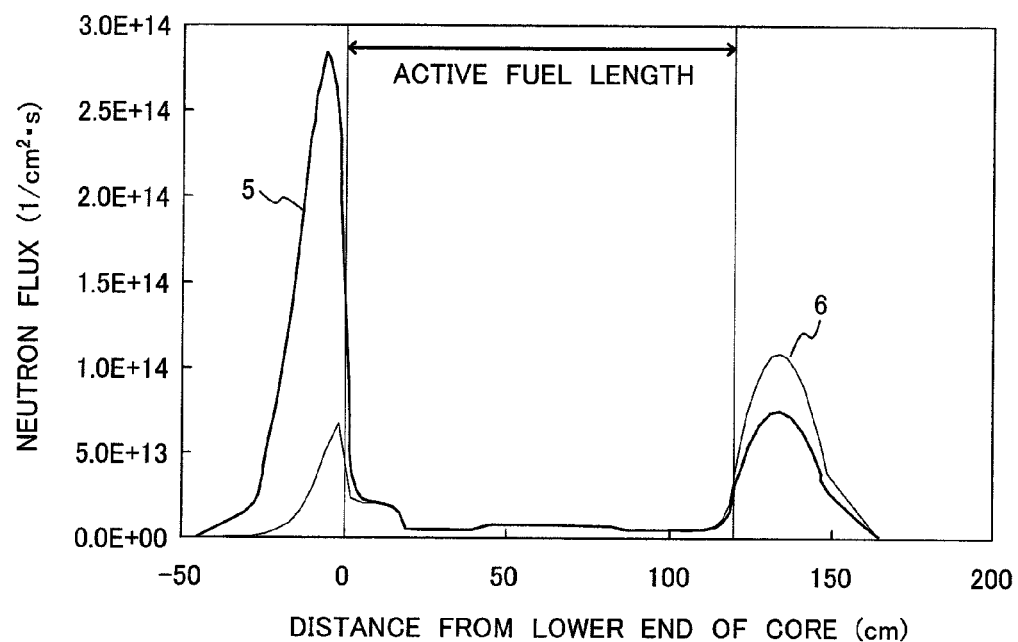
FIG. 3 is an explanatory drawing showing a thermal neutron flux distribution in an axial direction in a core having a fissile Pu breeding ratio of 1.01.

In FIG. 1, a property 1 shows an average power distribution in the axial direction of the core in the core having a fissile Pu breeding rate of 1.01 during its rated power operation, and a property 2 shows an average power distribution in the axial direction of the core when the core flow rate is reduced to 4 kt/h which is a flow rate of the coolant from an emergency high-pressure core flooder. In FIG. 2, a property 3 shows an average void fraction distribution in the axial direction of the core corresponding to the property 1, and a property 4 shows an average void fraction distribution in the axial direction of the core corresponding to the property 2. Due to the sudden drop of the core flow rate from a rated value of 21 kt/h to 4 kt/h, the void fraction distribution rapidly rises from the property 3 to the property 4, and at the same time, the boiling start point shifts to the lower end side of the core. This also shifts the power distribution in the axial direction of the core to the lower end side of the core from the property 1 to the property 2, as can be seen. When the core flow rate drops in such an extreme way, a large power peak may be generated in a reflector (cooling water) in the lower portion of the core, and positive reactivity may be introduced into the core in some cases. In the reactor cores disclosed in JP 3428150 B; R. TAKEDA et al., Proc. of International Conference on Evaluation of Emerging Nuclear Fuel Cycle Systems. GLOBAL '95 Versailles, France, September, 1995, P. 938; and R. TAKEDA et al., Proc. of International Conference on Advanced Nuclear Fuel Cycles and Systems. GLOBAL '07 Boise, USA, September, 2007, P. 1725, each safety rod, which is one type of control rod being withdrawn from the core during the rated power operation, is held, while being withdrawn, at the position which does not affect the core by introducing negative reactivity (a position 20 to 30 cm below the lower end of the core) as usually done in a relatively low-height core having a height of 2 m or less. Thermal neutron flux distribution in the axial direction of the core in this state is shown as a property 5 in FIG. 3. Thus, an upper end of a neutron absorber filling-zone of the safety rod being withdrawn below the lower end of the core during the reactor operation as described above, is positioned at the lower end of the core, so that this safety rod can absorb excess neutrons shifting to the lower portion of the core when the core flow rate is suddenly decreased. The thermal neutron flux distribution in the axial direction of the core at this time is shown as a property 6 in FIG. 3. However, positioning the upper end of the safety rod to the lower end of the core reduces reactivity of the core.

As a countermeasure to solve a lack of this reactivity, the height of fissile zones may be increased. However, in this proposal, the volume ratio of blanket zones per unit volume of the fissile zones is reduced which reduces the breeding ratio of fissile Pu, consequently, the core fails to meet a design target for the fissile Pu breeding ratio. In order to increase the fissile Pu breeding ratio, the height of each of the upper and lower blanket zones in the core must be further increased. The increase in the heights of these zones causes a neutron leak ratio in the axial direction of the core to decrease and the void coefficient, which is an important safety indicator, is worsened.

Figure 4:
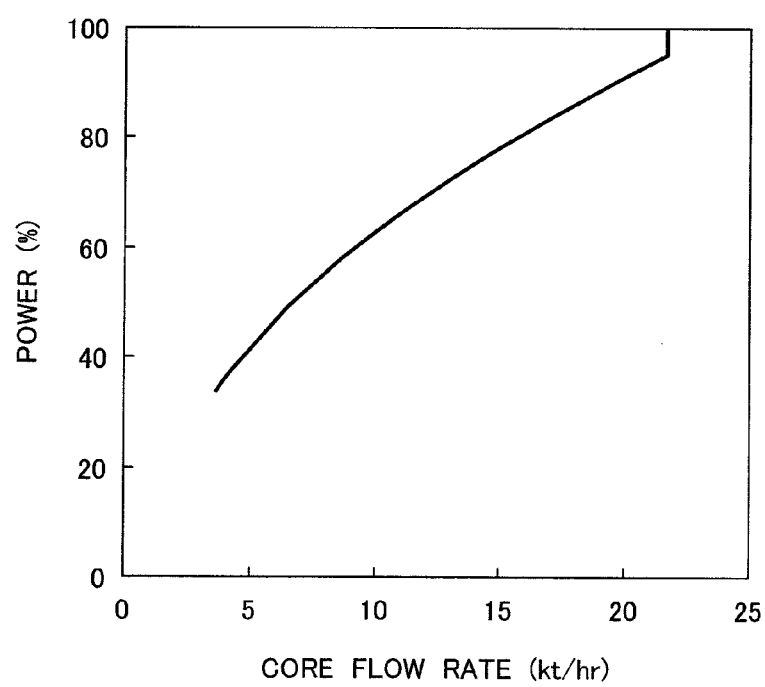
FIG. 4 is an explanatory drawing showing a relationship between power and a core flow rate in a core having a fissile Pu breeding ratio of 1.01.

The results of the study done by the inventors regarding a core of a light water reactor loaded with a plurality of fuel assemblies, in which the ratio of Pu-239 in all TRU included in each of these fuel assemblies at the time of zero burnup is in a range of 40 to 60%, including nuclear fuel material obtained by reprocessing, showed that when neutron absorbing material is disposed in the vicinity of the lower end of the core, the void coefficient can be prevented from getting worse by decreasing the height of an upper blanket zone and increasing the height of a lower blanket zone. In the light water breeder reactor, the above-mentioned vicinity of the lower end of the core means an area between the lower end of the core and a position, for example, 5 mm below the lower end of the core, and when the lower blanket zone is formed in the core, this lower blanket zone is also included in the vicinity of the lower end. By making the height of the lower blanket zone higher than that of the upper blanket zone, that is, by making sum of the heights of the upper and lower blanket zones 250 mm or higher and at the same time, making the height of the lower blanket zone 1.6 times or more that of the upper blanket zone, a breeding ratio of 1.01 can be maintained, all restrictive conditions are met, and at the same time, even with the occurrence of a compound event beyond design standards such as the core flow rate is substantially dropped for some reason and all control rods become inoperable, power can be automatically reduced to the power at which the fuel assemblies in the core can be cooled by the capacity of the coolant suppliable to the core by an emergency high-pressure core flooder as shown in FIG. 4. For this reason, a safety margin can be improved in the core of the light water reactor loaded with the fuel assemblies including the nuclear fuel material obtained by reprocessing, the ratio of Pu-239 in all the TRU included in each of these fuel assemblies at the time of zero burnup is in a range of 40 to 60%. When the sum of the heights of the upper and lower blanket zones is over 600 mm or when the height of the lower blanket zone is more than 12 times that of the upper blanket zone, the ratio of Pu-239 contained in all the TRU in the nuclear fuel material in the spent fuel assembly to be taken out from the core will be higher than the ratio of that contained in a new fuel assembly with a burnup of 0. For this reason, when the core flow rate is increased to keep these values in the same range, a pressure loss in the core will exceed the design standard, which will make the structure design of the fuel assemblies difficult. Thus, the sum of the heights of the upper and lower blanket zones should be within a range of 250 to 600 mm.

Figure 5:
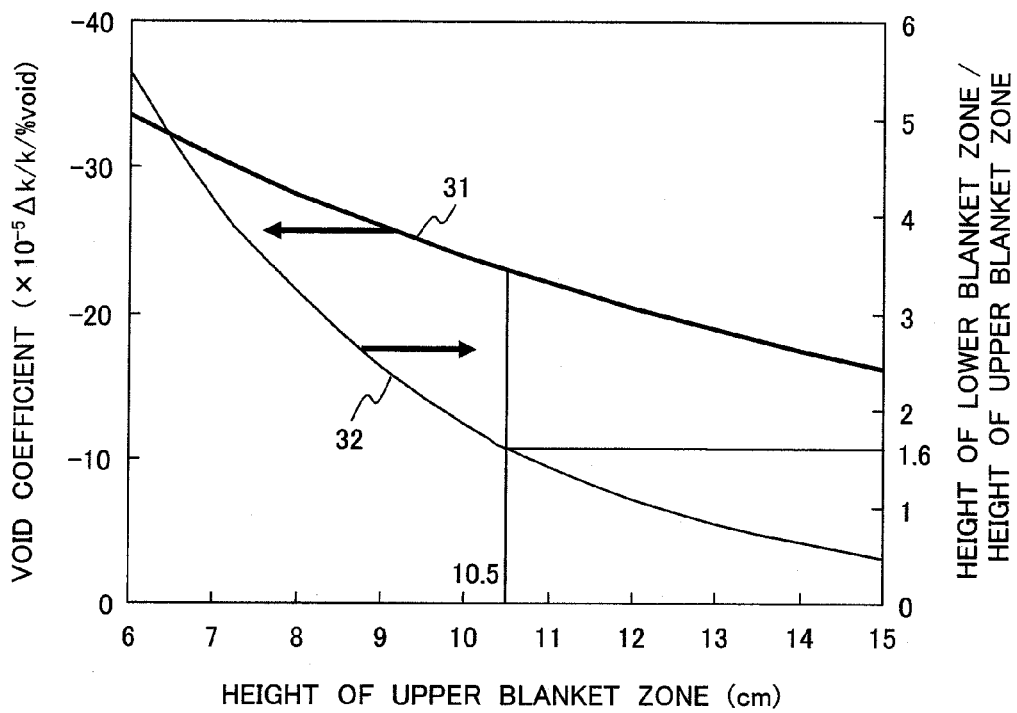
FIG. 5 is an explanatory drawing showing a relationship between a void coefficient corresponding to a height of an upper blanket zone and a ratio of a lower blanket zone to the upper blanket zone in a core having a fissile Pu breeding ratio of 1.01.

In FIG. 5, a property 31 shows a change in the void coefficient when the height of the upper blanket zone is varied in the core of the light water reactor having a fissile Pu breeding ratio of 1.01, and a property 32 shows a ratio of the height of the lower blanket zone to the height of the upper blanket zone. As shown in FIG. 5, it became clear that when the height of the upper blanket zone was 105 mm or lower, the height of the lower blanket zone would become 1.6 times or more the height of the upper blanket zone and the void coefficient would become more negative than $-2\times10^{-4}$ $\Delta k/k/\%$ void. By making the negative absolute value of the void coefficient larger, power can be automatically reduced to the power at which the fuel assemblies can be cooled by the capacity of the coolant suppliable by the emergency high-pressure core flooder even with the occurrence of a compound event beyond design standards such as the core flow rate being substantially reduced, that is, the void fraction in the core being substantially increased and all control rods being inoperable. When the height of the upper blanket zone is less than 30 mm, the power of fuel pellets located near the upper end of the upper blanket zone, being substantially affected by thermal neutron flux in the upper reflector, will exceed the design standard. Thus, the height of the upper blanket zone is set within a range of 30 to 105 mm.

Figure 6:
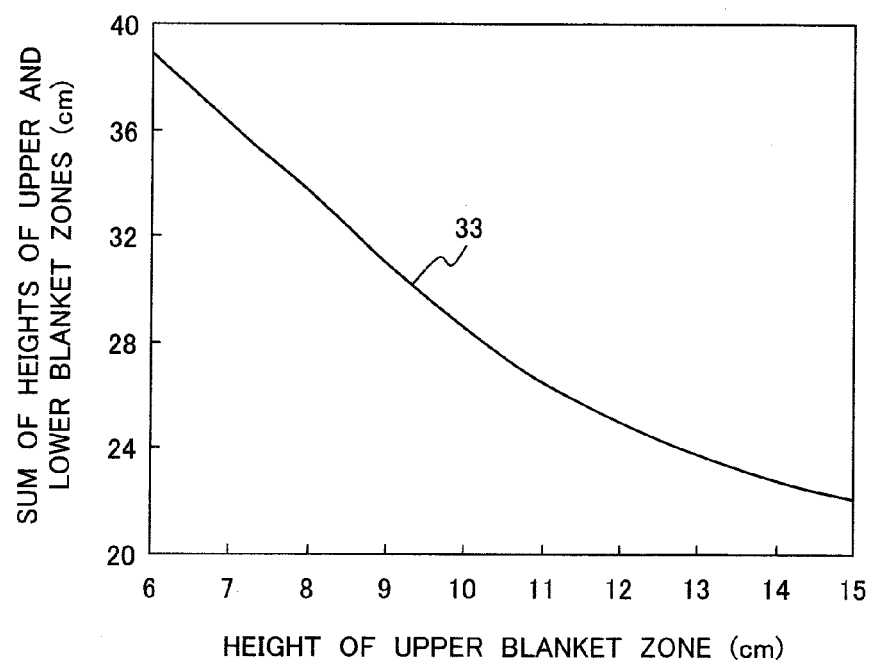
FIG. 6 is an explanatory drawing showing a relationship between a height of an upper blanket zone and sum of heights of the upper blanket zone and a lower blanket zone in a core having a fissile Pu breeding ratio of 1.01.

In FIG. 6, a property 33 shows the sum of the heights of the upper and lower blanket zones when the height of the upper blanket zone is varied. It became clear that by making the height of the upper blanket zone 105 mm or lower, the sum of the heights of the upper and lower blanket zones would be 250 mm or higher. Furthermore, when the reactor is operated while the upper end of the neutron absorber filling-zone of the safety rod is positioned in the vicinity of the lower end of the core, there may be a case that boron-10, which is a neutron absorber included in the safety rod, is used up very quickly. For this reason, in some cases, it is also useful to dispose pellets including a neutron absorbing material such as boron, gadolinia, Dy, Sm, Eu, etc. below the lower blanket zone in the fuel rod included in each fuel assembly.

The height of the lower blanket zone is made higher than that of the upper blanket zone and the height of the upper fissile zone including TRU in the core is made higher than the height of the lower fissile zone including TRU within a range of 10 to 25 mm. By making the height of the upper fissile zone at least 10 mm higher than the height of the lower fissile zone, the safety margin of the core can be improved even with the occurrence of the above compound event. When the height of the upper fissile zone is more than 25 mm higher than the height of the lower fissile zone, the power in the upper fissile zone will become too high, exceeding the design standard for the power.

Next, the results of the study done by the inventors regarding the core of the TRU disappearance reactor disclosed in R. TAKEDA et al., Proc. of International Conference on Advanced Nuclear Fuel Cycles and Systems. GLOBAL '07 Boise, USA, September, 2007, P. 1725 is described. As an example of the core of the TRU disappearance reactor, another BWR core with an electric power of 1350 MW, loaded with 720 fuel assemblies, each of which having 397 fuel rods, is described.

When TRU recycling is repeated for the purpose of decreasing TRU, in other words, when loading of the fuel assemblies into the core is repeated for every operation cycle, each of which fuel assemblies includes nuclear material obtained by reprocessing and the ratio of Pu-239 in all the TRU included in each of which fuel assembly at the time of zero burnup is at least 5% but less than 40%, fast neutrons leaked out from the core are moderated due to the neutron moderation effect by hydrogen atoms forming the water in a reflector region in the lower portion of the core, causing a large power peak of thermal neutrons. In order to avoid a problem of the power of fuel pellets, which are located in the vicinity of the lower end of a lower fissile zone of each of the fuel assemblies adjoining each other in the core, exceeding the value of the design standard due to the neutron current continuity condition, a lower blanket zone of about 20 mm high is constructed below the lower fissile zone in the TRU disappearance reactor disclosed in R. TAKEDA et al., Proc. of International Conference on Advanced Nuclear Fuel Cycles and Systems. GLOBAL '07 Boise, USA, September, 2007, P. 1725. By applying any of the above-described methods (5) and (6) for improving the safety potential, which the inventors have found out, it is no longer necessary to provide the lower blanket zone in the lower portion of the core since the occurrence of the power peak of thermal neutrons in the reflector (cooling water) in the vicinity of the lower end of the core can be controlled by positioning the upper end of a neutron absorber filling-zone of a control rod in the vicinity of the lower end of the core. In other words, the fissile zone, or particularly the lower end of the lower fissile zone, matches the lower end of the core. In the TRU disappearance reactor, the above-mentioned vicinity of the lower end of the core for positioning the upper end of the neutron absorber filling-zone of the control rod means an area between the lower end of the core and a position, for example, 5 mm below the lower end.

Figure 7:
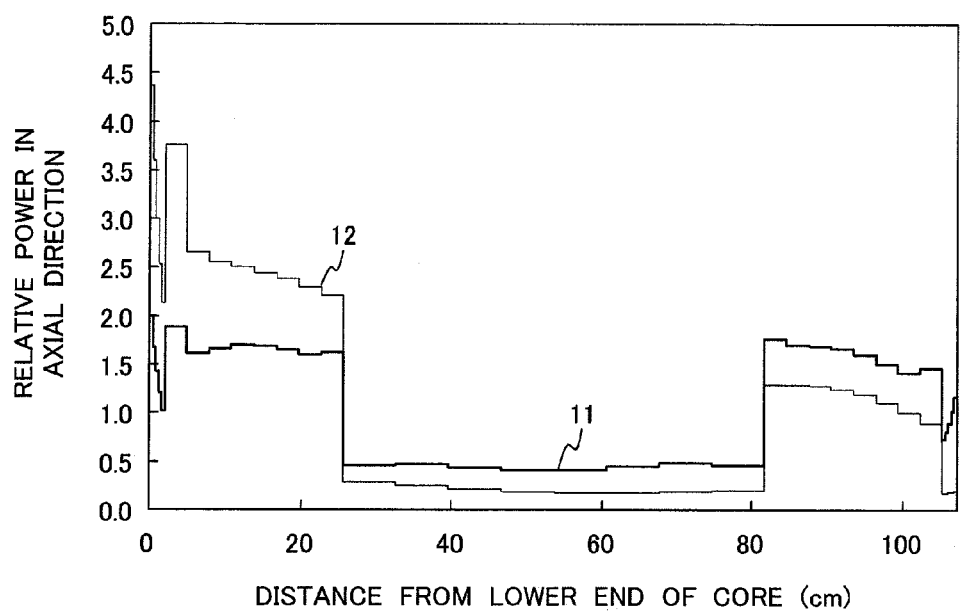
FIG. 7 is an explanatory drawing showing an average power distribution in an axial direction of a core in a BWR core for disappearing TRU during its rated power operation, and an average power distribution in the axial direction of the core when a core flow rate is dropped to 4 kt/h which is a flow rate of coolant suppliable by an emergency high-pressure flooder.
Figure 8:
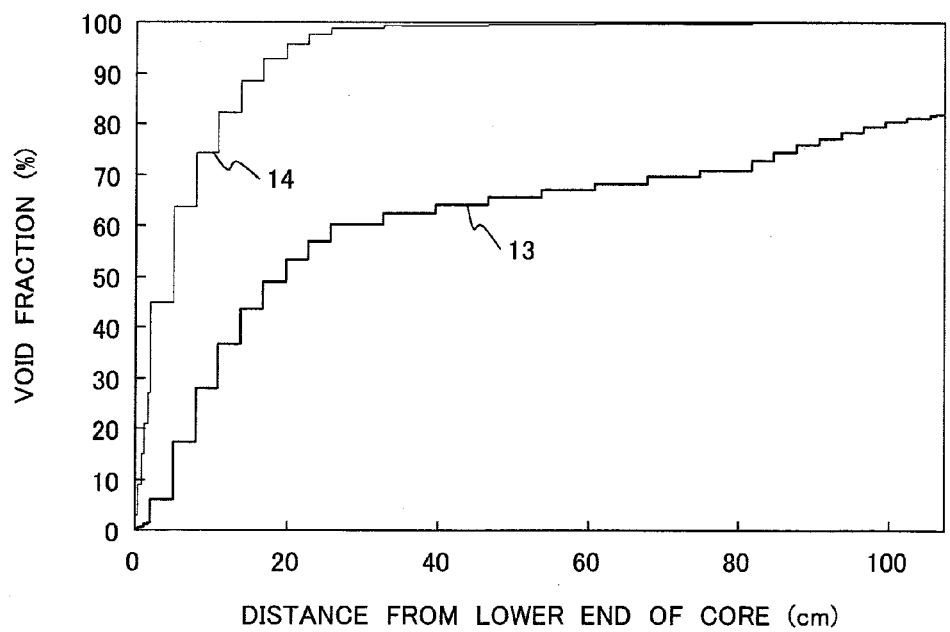
FIG. 8 is an explanatory drawing showing an void fraction distribution in an axial direction of a core in a BWR core for disappearing TRU during its rated power operation, and a void fraction distribution in the axial direction of the core when a core flow rate is dropped to 4 kt/h which is a flow rate of coolant suppliable by an emergency high-pressure flooder.
Figure 9:
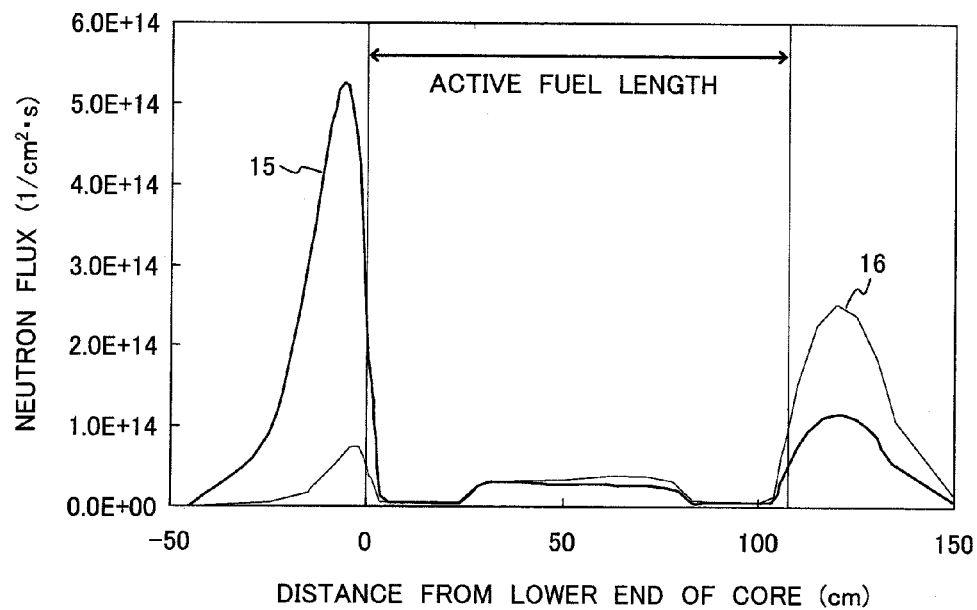
FIG. 9 is an explanatory drawing showing a thermal neutron flux distribution in an axial direction of a core in a BWR core for disappearing TRU.
Figure 10:
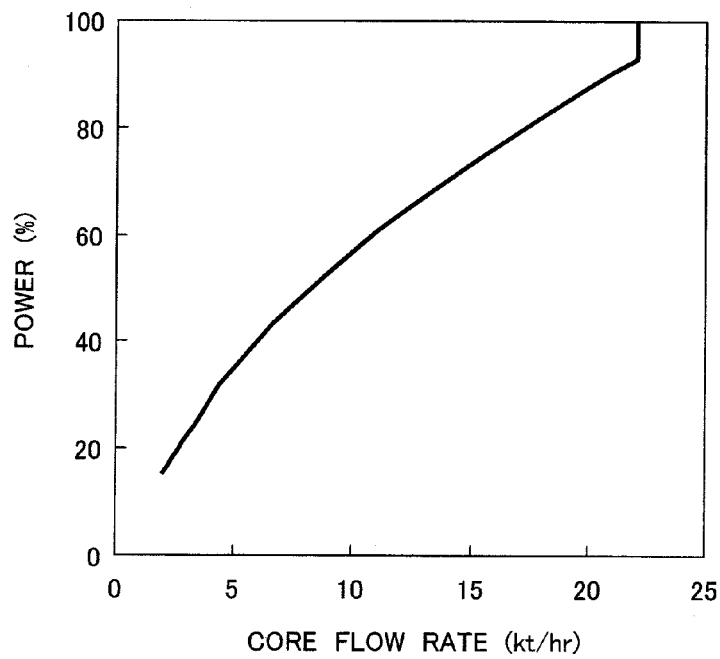
FIG. 10 is an explanatory drawing showing a relationship between power and a core flow rate in a BWR core for disappearing TRU.

In FIG. 7, a property 11 shows an average power distribution in the axial direction of the core during the rated power operation, and a property 12 shows an average power distribution in the axial direction of the core when the core flow rate is dropped to 4 kt/h which is a flow rate of the cooling water suppliable by the emergency high-pressure core flooder. In FIG. 8, a property 13 shows an average void fraction distribution in the axial direction of the core corresponding to the property 11, and a property 14 shows an average void fraction distribution in the axial direction of the core corresponding to the property 12. Due to the sudden drop in the core flow rate from a rated value of 20 kt/h to 4 kt/h, the average void fraction distribution in the axial direction of the core rapidly increases from the property 13 to the property 14 shown in FIG. 8. At the same time, the boiling start point shifts to the lower end side of the core, causing the power distribution in the axial direction of the core to shift from the property 11 to the property 12 shown in FIG. 7. When the core flow rate drops in such an extreme way, a large power peak is generated in the reflector in the lower portion of the core and positive reactivity may be introduced into the core in some cases. Each safety rod which is being withdrawn from the core during the rated power operation, is held, while being withdrawn, at a position where the safety rod does not affect the core by introducing negative reactivity (example for, a position 30 cm below the lower end of the core), as usually done in a relatively low-height core having a height of 2 m or less. In FIG. 9, a property 15 shows thermal neutron flux distribution in the axial direction of the core in the core provided with a 20-mm-high lower blanket zone without a neutron absorber filling-zone of a safety rod disposed in the vicinity of the lower end. While the upper end of the neutron absorber filling-zone of the safety rod, which is being withdrawn below the lower end of the core during the reactor operation, is positioned at the lower end of the core and when the core flow rate is suddenly decreased, the safety rod can absorb excess neutrons shifting to the lower portion of the core. A property 16 in FIG. 9 shows the thermal neutron flux distribution in the axial direction of the core at that time. As shown in FIG. 10, even with the occurrence of a compound event beyond design standards such as the core flow rate substantially dropping for some reason and all control rods becoming inoperable, power can be automatically reduced to the power at which the fuel assemblies in the core can be cooled by the capacity of the coolant suppliable to the core from the emergency core flooder. For this reason, a safety margin can be improved in the core of the light water reactor loaded with the fuel assemblies including the nuclear fuel material obtained by reprocessing, the ratio of Pu-239 in all the TRU included in each of these fuel assemblies at the time of zero burnup is at least 5% but less than 40%.

In the core of the TRU disappearance reactor, a safety margin of the core can be improved by making the height of the upper blanket zone 100 mm or less. However, when the height of the upper blanket zone is less then 20 mm, the power of fuel pellets located near the upper end of the upper blanket zone, being substantially affected by thermal neutron flux in the upper reflector, will exceed the design standard as in the light water breeder reactor. Thus, the height of the upper blanket zone is set within a range of 20 to 100 mm.

The reason for making the height of the upper fissile zone higher than the height of the lower fissile zone within a range of 1.0 to 25 mm in the core of the TRU disappearance reactor is the same as the reason for setting these values in the light water breeder reactor.

Various embodiments of the present invention are described below in detail with reference to the figures.

Embodiment 1

A core of a light water reactor core according to embodiment 1, which is a preferred embodiment of the present invention, is described below in detail with reference to FIGS. 11 to 19 and Table 1.

TABLE 1

| Nuclide | Composition (wt %) |
| --- | --- |
| Np-237 | 0.5 |
| Pu-238 | 2.9 |

TABLE 1-continued

| Nuclide | Composition (wt %) |
| --- | --- |
| Pu-239 | 44.0 |
| Pu-240 | 36.2 |
| Pu-241 | 5.0 |
| Pu-242 | 4.9 |
| Am-241 | 3.6 |
| Am-242M | 0.2 |
| Am-243 | 1.3 |
| Cm-244 | 1.0 |
| Cm-245 | 0.3 |
| Cm-246 | 0.1 |

A core 20 of a light water reactor in the present embodiment is for generating an electric power of 1350 MW; however, the power scale is not limited to this value. A core having a different power scale, to which the present embodiment can be applied, can be achieved by changing the number of fuel assemblies loaded into the core 20.

Figure 11:
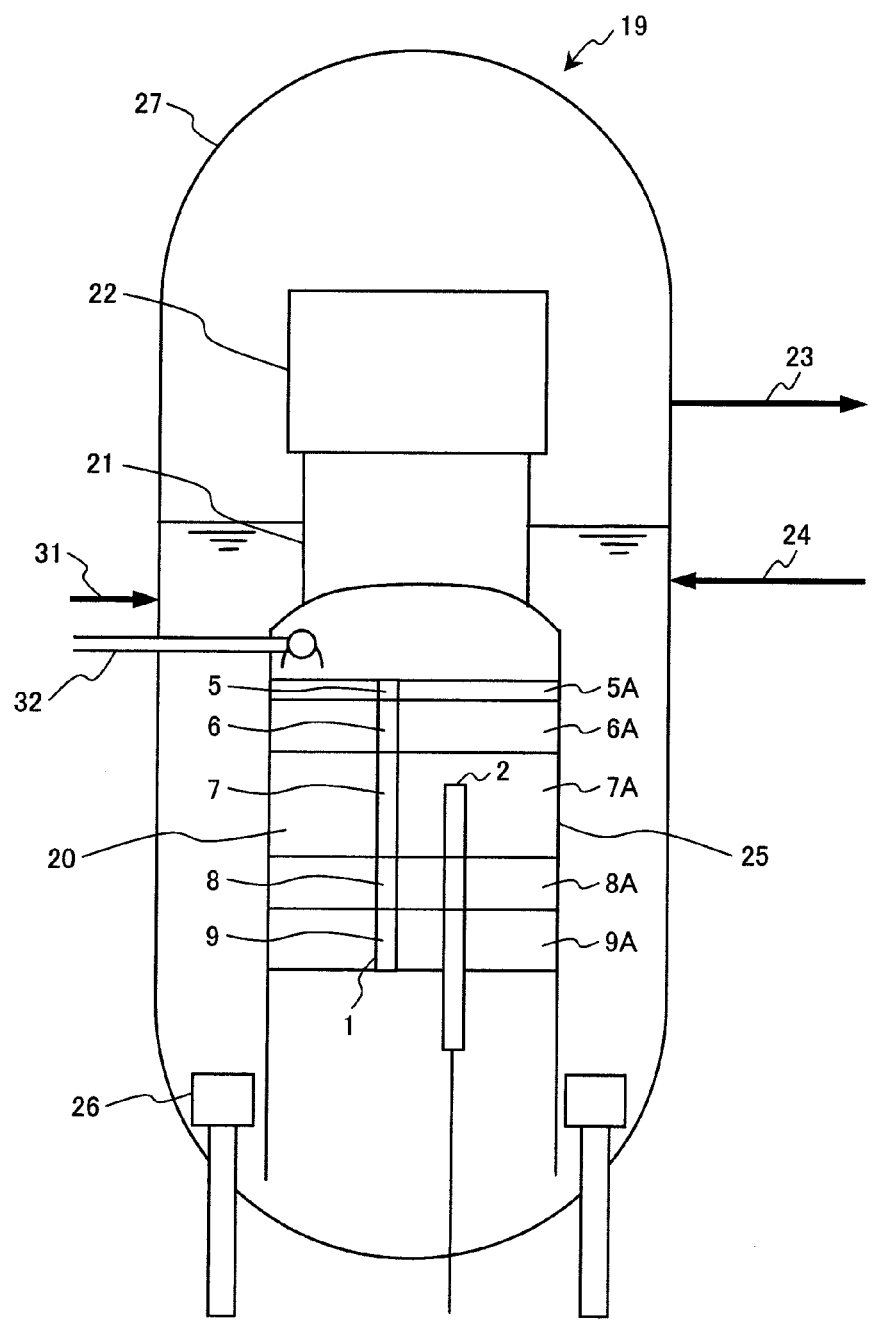
FIG. 11 is a longitudinal sectional view showing a light water reactor having a core according to embodiment 1, which is a preferred embodiment of the present invention.
Figure 12:
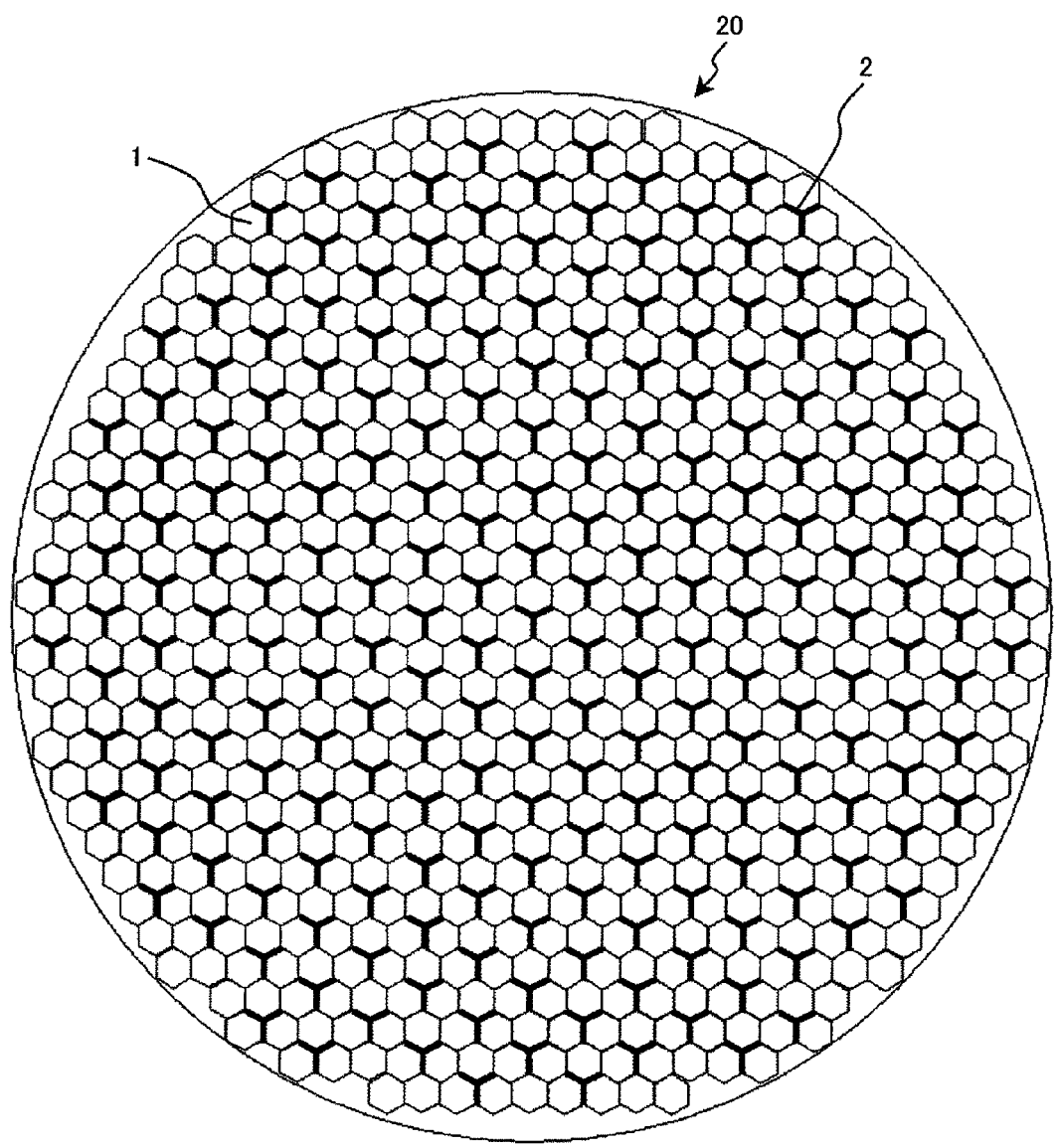
FIG. 12 is a transverse sectional view of the core shown in FIG. 11.

An overview of a BWR, which is a light water reactor for generating an electric power of 1350 MW and to which the core 20 of the present embodiment is applied, is described based on FIG. 11. A BWR 19 has the core 20, a steam separator 21, and a stream dryer 22 disposed in a reactor pressure vessel 27. The core 20 is a parfait-type core, which is surrounded by a core shroud 25 in the reactor pressure vessel 27. A plurality of control rods 2 is disposed at the positions which allow the control rods 2 to be inserted into the core 20. These control rods 2 are inserted into the core 20 from below. The steam separator 21 is disposed above the core 20, and the steam dryer 22 is disposed above the steam separator 21. A plurality of internal pumps 26 is provided at the bottom portion of the reactor pressure vessel 27, and impellers of each internal pump 26 are disposed in a downcomer formed between the reactor pressure vessel 27 and the core shroud 25. A main steam pipe 23 and a feed water pipe 24 are connected to the reactor pressure vessel 27. The BWR 19 is equipped with a low-pressure core flooder 31 and a high-pressure core flooder 32 as an emergency core cooling system in case the coolant to be supplied to the core is lost for some reason. As shown in FIG. 12, the core 20 is loaded with 720 fuel assemblies 1. One Y-shaped control rod 2 is provided for every three fuel assemblies 1, and 223 control rods 2 are disposed. Approximately ⅙ of the 223 control rods 2 are control rods for adjusting the reactor power (power adjustment control rods) by being inserted into or withdrawn from the core 20 in the BWR 19 during the operation, and the approximately ⅚ remaining are control rods 2 for inserting into the core 20 when the reactor is shutdown (hereinafter referred to as safety rods), which are being withdrawn from the core 20 in the BWR 19 during the operation. The fuel assembly 1 sequentially forms five zones, i.e., an upper blanket zone 5, an upper fissile zone 6, an inner blanket zone 7, a lower fissile zone 8, and a lower blanket zone 9, from the upper end to the lower end in a portion of an active fuel length (see FIG. 17). In the core 20 loaded with the plurality of fuel assemblies 1, five zones are sequentially formed from the upper end to the lower end, i.e., an upper blanket zone 5A formed by the upper blanket zones 5, an upper fissile zone 6A formed by the upper fissile zones 6, an inner blanket zone 7A formed by the inner blanket zones 7, a lower fissile zone 8A formed by the lower fissile zones 8, and a lower blanket zone 9A formed by the lower blanket zones 9 (see FIG. 1). The zones 5A, 6A, 7A, 8A, and 9A are located at the same positions in the axial direction of the core 20 as the zones 5, 6, 7, 8, and 9 of each fuel assembly 1 respectively.

Figure 13:
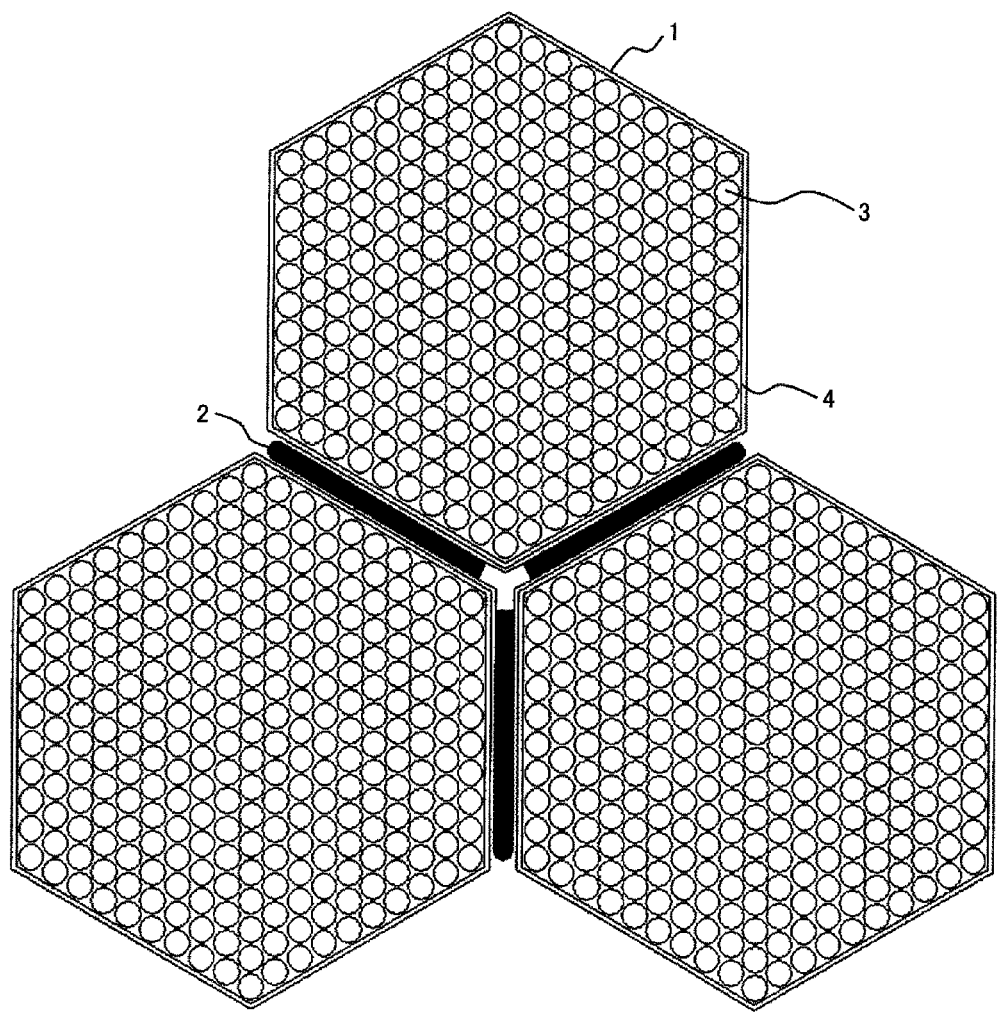
FIG. 13 is a transverse sectional view of a fuel assembly lattice shown in FIG. 12.
Figure 14:
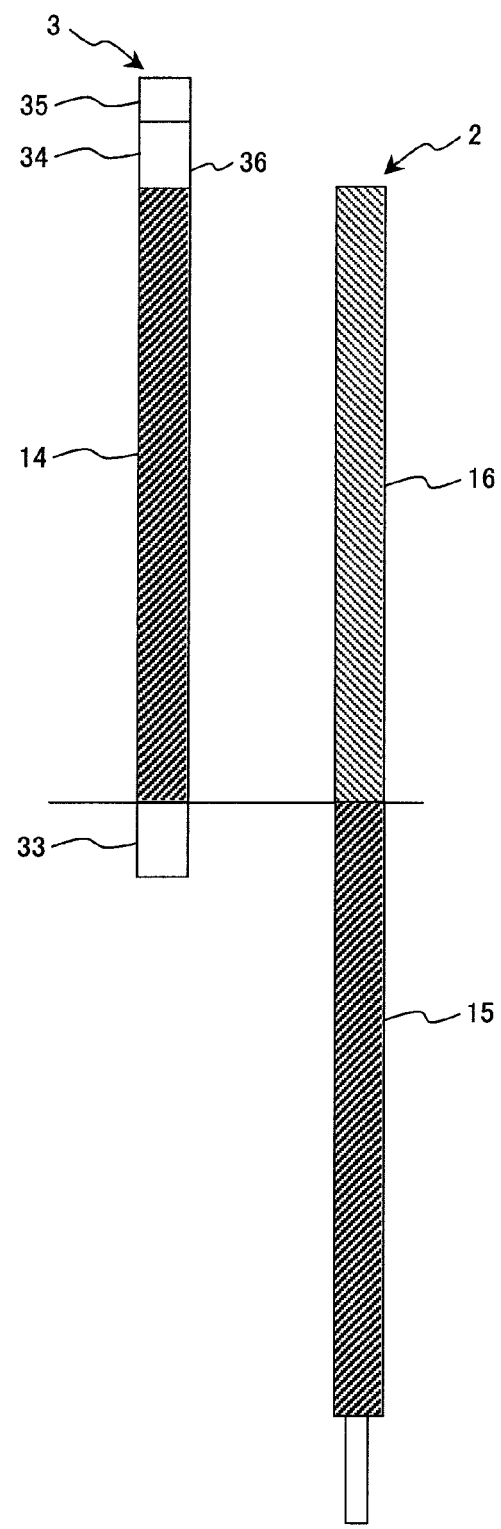
FIG. 14 is an explanatory drawing showing a positional relationship in an axial direction between a fuel rod and a Y-shaped control rod in the fuel assembly shown in FIG. 13.

In the fuel assembly 1, as shown in FIG. 13, 271 fuel rods 3, each having a diameter of 10.1 mm, are disposed in a regular triangle lattice in a channel box 4 which is a hexagonal tube. The transverse cross-sectional shape of the fuel assembly 1 is hexagonal. A gap between the fuel rods 3 disposed in the fuel assembly 1 is 1.3 mm. A plurality of fuel pellets (not shown) composed of nuclear fuel material, arranged in the axial direction, is disposed in a cladding tube 36 of each fuel rod 3. Nine fuel rods 3 are disposed in a fuel rod row in an outermost peripheral layer. In the fuel rod 3, as shown in FIG. 14, the plurality of fuel pellets prepared by using the nuclear fuel material obtained by reprocessing is filled in the cladding tube 36 whose a lower end portion and an upper end portion are hermetically sealed with a lower end plug 33 and an upper end plug 35 respectively. An active fuel length 14 is a zone filled with these fuel pellets. A gas plenum 34 is formed between an upper end of the active fuel length 14 and the upper end plug 35 in the hermetically sealed cladding tube 36. In the active fuel length 14 in each fuel rod 3, the above-mentioned five zones, i.e., the upper blanket zone 5, the upper fissile zone 6, the inner blanket zone 7, the lower fissile zone 8, and the lower blanket zone 9 are sequentially formed from the upper end to the lower end.

The control rod 2 having a Y-shaped cross section has three blades extending outward from a tie rod located in the center. Each blade is provided with a plurality of neutron absorbing rods filled with $B_4C$, which is a neutron absorber, and disposed around the tie rod at intervals of 120 degrees. The control rod 2 is provided with a follower portion 16 composed of carbon, which is a material having a smaller moderating power than light water, in the insertion end portion to be inserted into the core 20 first. Below the follower portion 16 in the control rod 2 is a neutron absorber filling-zone 15 formed by the neutron absorber filled in each neutron absorber rod (see FIG. 14).

When the BWR 19 is in operation at its rated power, the safety rods, which are control rods 2 being completely withdrawn, are withdrawn from the core 20 such that the upper end of the neutron absorber filling-zone 15 is positioned at the lower end of the active fuel length 14 in the fuel rod 3 (see FIG. 14).

When the BWR 19 is in operation, the coolant in the downcomer is pressurized by rotation of the internal pumps (coolant supplying apparatuses) 26 and then supplied into the core 20. The coolant supplied into the core 20 is introduced to each fuel assembly 1, and heated by heat generated by nuclear fission of the nuclear fission material, causing part of the coolant to turn into steam. The coolant in a gas-liquid two-phase flow state is introduced from the core 20 to the steam separator 21, where the steam is separated. Moisture in the separated steam is further removed by the steam dryer 22. The steam from which the moisture has been removed is supplied to a turbine (not shown) through the main steam pipe 23 and rotates the turbine. A power generator (not shown) linked to the turbine rotates and generates electric power. The steam exhausted from the turbine is condensed in a condenser (not shown) and turns into condensed water. This condensed water (feed water) is introduced into the reactor pressure vessel 27 through the feed water pipe 24. The liquid coolant separated by the steam separator 22 is mixed with the above feed water in the downcomer and pressurized by the internal pumps 26 again. The rated flow rate of the BWR 19 is 22 kt/h.

Figure 15:
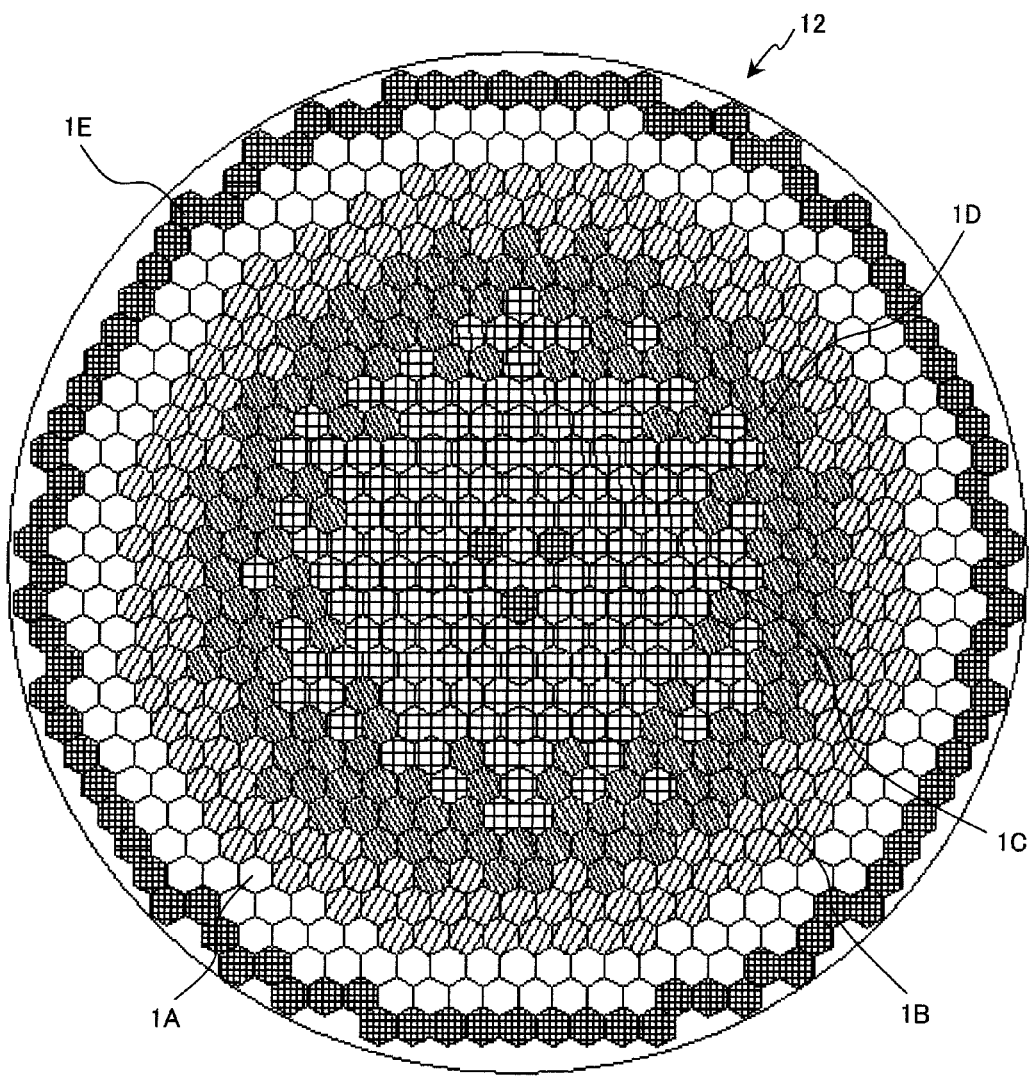
FIG. 15 is an explanatory drawing showing an arrangement of fuel assemblies in a core shown in FIG. 11, when the core is in the state of being an equilibrium core.
Figure 16:
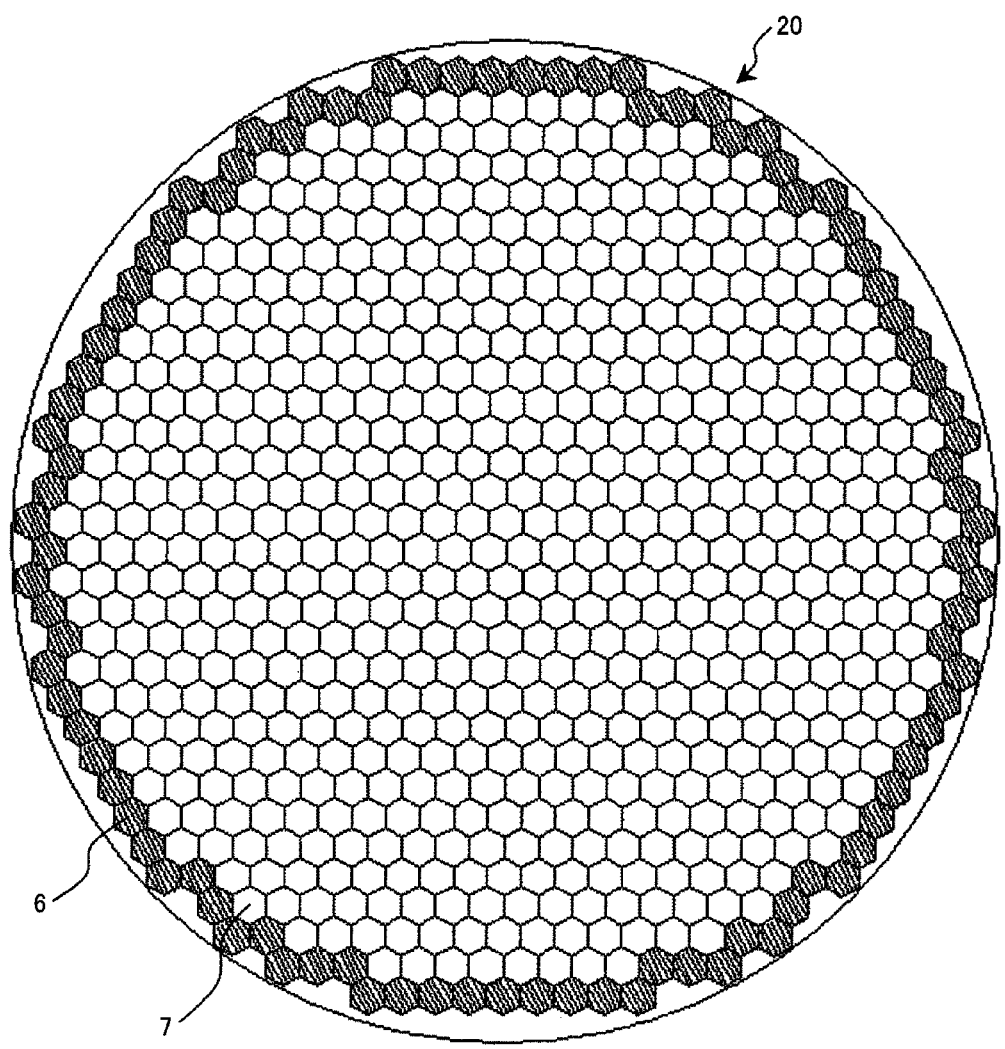
FIG. 16 is an explanatory drawing showing a distribution of orifice openings in the equilibrium core shown in FIG. 15.
Figure 17:
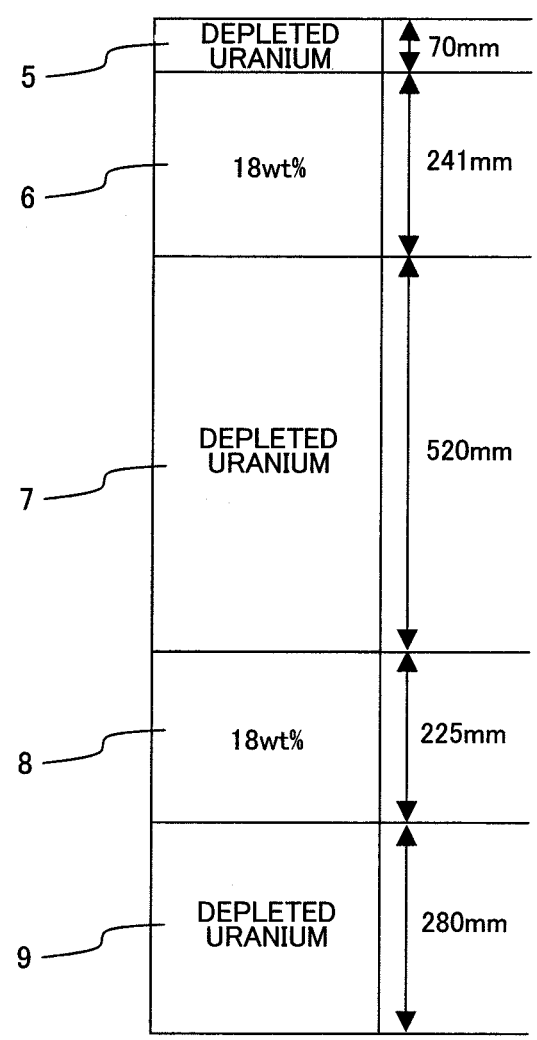
FIG. 17 is an explanatory drawing showing a fissile Pu enrichment distribution in an axial direction in a new fuel assembly to be loaded into the core, which is an equilibrium core, shown in FIG. 11.
Figure 18:
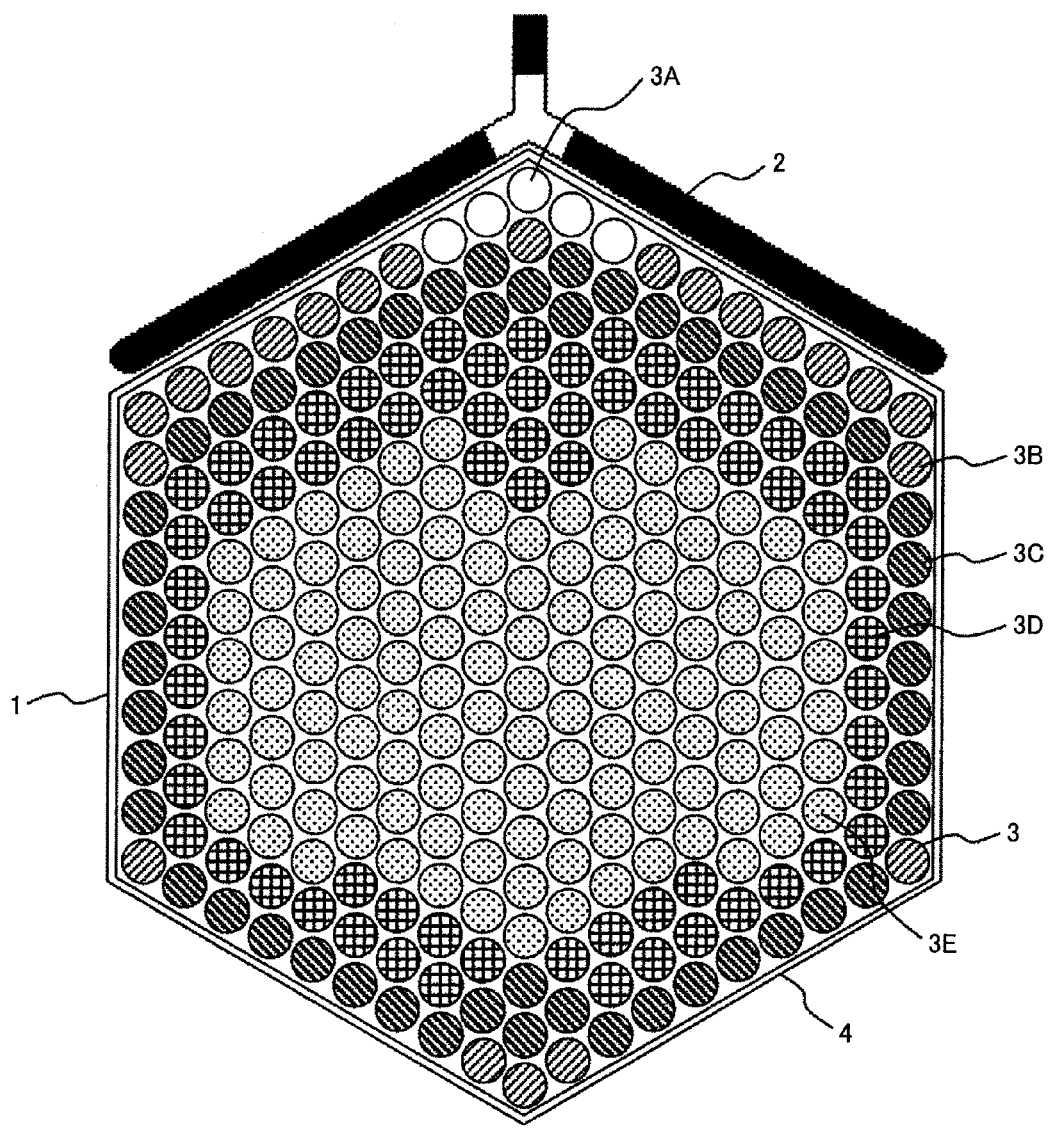
FIG. 18 is an explanatory drawing showing an arrangement of fuel rods having different enrichments of fissile Pu in a transverse cross-section of the fuel assembly shown in FIG. 13.
Figure 19:
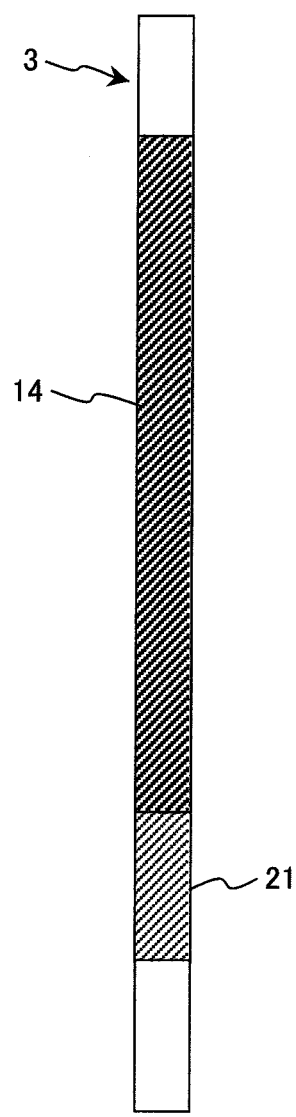
FIG. 19 is an explanatory drawing showing a structure of a fuel rod in an axial direction in the fuel assembly shown in FIG. 13.

An arrangement of the fuel assemblies 1 in the core 20 in the state of being an equilibrium core is described with reference to FIG. 15. Fuel assemblies 1E (four-times burned fuel assemblies 1E) in the operation cycle of which is the fifth cycle and staying in the core for the longest time in the in-core fuel dwelling time, are disposed in the outermost peripheral region of the core having a low neutron importance. In a core outer region internally adjacent to the outermost peripheral region, fuel assemblies 1A (fresh fuel assemblies 1A) staying in the core in a first cycle in the in-core fuel dwelling time and having the highest neutron infinite multiplication, are loaded to flatten the power distribution in the radial direction of the core. In a core inner region, fuel assemblies 1B, 1C, and 1D (once-burned fuel assemblies 1B, twice-burned fuel assemblies 10, and three-times burned fuel assemblies 1D) are disposed, the operation cycles of which are respectively second cycle, third cycle, and fourth cycle in the in-core fuel dwelling time. Such an arrangement is made to flatten the power distribution in the core inner region. Each of the fuel assemblies 1A, 1B, 1C, 1D, and 1E is a fuel assembly 1 shown in FIG. 13, and FIGS. 17 and 18 given later. A plurality of fuel supports (not shown) are provided to a core plate (not shown) disposed to the lower end portion of the core 20. Lower tie-plates (not shown) of four fuel assemblies 1 are supported by one fuel support. Four coolant passages for introducing the coolant to four fuel assemblies are formed in each fuel support, and an orifice (not shown) provided to each fuel support is disposed at the inlet portion of each coolant passage. The core 20 forms two regions in the radial direction, an outermost peripheral region 6 and an inner region 7 located inside the outermost peripheral region 6 (see FIG. 16). Each orifice located in the outermost peripheral region 6, where the power of the fuel assembly 1 is small, has a smaller bore diameter than that of the orifice located in the inner region 7. As shown in FIG. 17, the fuel assembly 1 has five zones, i.e., the upper blanket zone 5, the upper fissile zone 6, the inner blanket zone 7, the lower fissile zone 8, and the lower blanket zone 9, sequentially formed in the portion of the active fuel length from the upper end to the lower end. The height of each zone is as follow: the upper blanket zone 5 (the upper blanket zone 5A) is 70 mm high, the upper fissile zone 6 (the upper fissile zone 6A) is 241 mm high, the inner blanket zone 7 (the inner blanket zone 7A) is 520 mm high, the lower fissile zone 8 (the lower fissile zone 8A) is 225 mm high, and the lower blanket zone 9 (the lower blanket zone 9A) is 280 mm high. When the fuel assembly 1 is a new fuel assembly with a burnup of 0, all the fuel rods 3 in the fuel assembly 1 are filled with depleted uranium oxide pellets in the three blanket zones. The upper fissile zone 6 and the lower fissile zone 8 are filled with mixed oxide fuel having a mixture ratio of 100 parts by average weight of TRU to 172 parts by weight of depleted uranium. A weight ratio of fissile Pu to the total weight of the TRU and the depleted uranium in the mixed oxide fuel, that is, an average enrichment of the fissile Pu is 18 wt %. The TRU is a material extracted, by reprocessing, from the nuclear fuel material contained in the spent fuel assemblies 1. None of the blanket regions are filled with the mixed oxide fuel. Instead of the depleted uranium, the oxide pellets of natural uranium or of the depleted uranium recovered from a spent fuel assembly may be used in each blanket zone. The fuel assembly 1 includes five types of fuel rods 3 shown in FIG. 18. These fuel rods 3 are fuel rods 3A to 3E. The fuel rods 3A to 3E are disposed in the fuel assembly 1 as shown in FIG. 18. In the mixed oxide fuel filled in each of the upper fissile zone 6 and the lower fissile zone 8 of each of the fuel rods 3A to 3E, a fissile Pu enrichment is 10.7 wt % in the fuel rod 3A, 13.5 wt % in the fuel rod 3B, 16.8 wt % in the fuel rod 3C, 18.2 wt % in the fuel rod 3D, and 19.5 wt % in the fuel rod 3E, when the fuel assembly is new fuel assembly having a burnup of 0. The average enrichment of the fissile Pu is 18 wt % for both the upper and lower fissile zones 6 and 8. None of the blanket zones of each fuel rod 3 includes TRU, but the mixed oxide fuel in the upper fissile zone 6 and the lower fissile zone 8 of each fuel rod 3 includes TRU with the composition shown in Table 1 when the burnup is 0. When the fuel assembly 1 is a new fuel assembly, the ratio of Pu-239 in all the TRU is 44 wt %. Table 1 shows a composition of TRU in the nuclear fuel material obtained by reprocessing the nuclear fuel material in a spent fuel assembly, included in a fuel assembly 1, which was originally taken out of the core 20, stayed outside the core for the total of three years, that is, two years in a fuel storage pool and a fuel reprocessing facility and one year in a fuel manufacturing facility, and then loaded again into the core as a new fuel assembly. A plurality of TRU isotopes of the TRU shown in Table 1 is included in the nuclear fuel material in the new fuel assembly 1 obtained by reprocessing. The present embodiment achieves TRU multi-recycling in which, the composition of the TRU in the fuel assembly taken out from the core at the completion of an operation cycle and the composition of the TRU in the fuel assembly newly loaded to the core ready to start the operation cycle are practically uniform.

According to the present embodiment in which, the sum of the heights of the upper blanket zone and the lower blanket zone is 350 mm and the height of the lower blanket zone is 4 times the height of the upper blanket zone, a sufficient safety margin can be maintained even with the occurrence of a compound event beyond design standards during the operation of the BWR 19 such as the core flow rate suddenly dropping for some reason and all the control rods being inoperable, by positioning the upper end of the neutron absorber filling-zone 15 of the safety rod, which is a control rod 2 being completely withdrawn at the starting time of the rated operation of the reactor, to the lower end of the active fuel length 14 of the fuel rod 3 (the lower end of the core 20) (see FIG. 14). On the occurrence of such a compound event, the void fraction in the core rapidly rises, the boiling start point of the coolant being slightly sub-cooled and flowing into the core from below the core, shifts to the lower end side of the core, and the power distribution in the axial direction of the core shifts to the lower end side of the core. For this reason, $B_4C$ in the neutron absorber filling-zone 15 whose upper end is positioned at the lower end of the core, that is, the lower end of the lower blanket zone 9A, can absorb excess neutrons shifting to the lower end of the core. As a result, in the present embodiment, power can be automatically reduced to the power at which the fuel assemblies 1 in the core 20 can be cooled by the capacity of the coolant suppliable by the emergency high-pressure core flooder 32, and a sufficient safety potential can be maintained even with the occurrence of the compound event beyond design standards. The present embodiment such as this can improve a safety margin without sacrificing the economic efficiency of the light water breeder reactor, which is a light water reactor, even with the occurrence of the above composite event.

In the present embodiment, since the height of the lower blanket zone is higher than the height of the upper blanket zone and the height of the upper blanket zone is 70 mm, which is no more than 105 mm, the safety margin of the to core upon the occurrence of the above compound event can be further improved.

In the present embodiment, since the height of the lower blanket zone is higher than the height of the upper blanket zone and the height of the upper fissile zone is 16 mm, which is at least 10 mm, higher than that of the lower fissile zone, the safety margin of the core upon the occurrence of the above compound event can is be further improved. In order to suppress a decrease in reactor reactivity when the upper end of the neutron absorber filling-zone 15 of the safety rod, which is a control rod 2 being completely withdrawn during the rated power operation of the BWR 19, is positioned at the lower end of the active fuel length 14 of the fuel rod 3, the height of the upper fissile zone 6 is set to 241 mm and the height of the lower fissile zone 8 to 225 mm. In addition, in order to maintain a breeding ratio to 1.01 while keeping an impact to the void fraction minimum, the height of the upper blanket zone 5 is set to 70 mm and the height of the lower blanket zone 9 to 280 mm which is 1.6 times more that of the upper blanket zone 5.

The present embodiment can meet all the restrictive conditions, maintain a breeding ratio of 1.01, and at the same time, automatically reduce power to the power at which the fuel assemblies can be cooled by the capacity of the coolant suppliable to the core by the emergency high-pressure core flooder 32 even with the occurrence of a compound event beyond design standards such as the core flow rate significantly dropping for some reason and all the control rods being inoperable. For this reason, the safety margin of the BWR 19, which is a light water breeder reactor, can be improved (see FIG. 4).

In the BWR 19 to which the core 20 is applied and which generates the same electric power of 1350 MW as a current ABWR by using a reactor pressure vessel 27 of approximately the same size as that in the ABWR, a higher discharge burnup can be achieved in a core zone which includes the upper fissile zone 6A, the lower fissile zone 8A, and the inner blanket zone 7A, but excludes the upper blanket zone 5A and the lower blanket zone 9A, than a burnup of 45 GWd/t in the light water breeder reactor stated in JP 3428150B. The discharge burnup of the core zone in the core 20 becomes 53 GWd/t and the discharge burnup of the core 20 including the upper blanket zone 5A and the lower blanket zone 9A becomes 45 GWd/t. According to the present embodiment, MCPR is 1.3 and the void coefficient is $-3\times10^{-4}$ $\Delta k/k/\%$ void, the absolute value of which is one digit higher than the void coefficient $-2\times10^{-5}$ $\Delta k/k/\%$ void of the light water breeder reactor stated in R. TAKEDA et al., Proc. of International Conference on Advanced Nuclear Fuel Cycles and Systems. GLOBAL '07 Boise, USA, September, 2007, P. 1725. Furthermore, according to the present embodiment, a breeding rate of 1.01 can be achieved while the ratios of TRU isotopes are maintained practically constant as described above.

In the present embodiment, the same effect can be obtained by disposing pellets 21 including a neutron absorbing material such as boron, gadolinia, Dy, Sm, Eu, etc. below the active fuel length 14 of the fuel rod 3 included in each fuel assembly (see FIG. 19) instead of positioning the upper end of the neutron absorber filling-zone 15 of the safety rod being completely withdrawn, below the lower end of the active fuel length 14 of the fuel rod 3 (the lower end of the lower blanket zone 9A) (see FIG. 14).

Embodiment 2

A core of a light water reactor core according to embodiment 2, which is another embodiment of the present invention, is described below in detail with reference to FIGS. 20 to 22 and Table 2.

TABLE 2

| Nuclide | Composition (wt %) |
| --- | --- |
| Np-237 | 0.1 |
| Pu-238 | 4.8 |
| Pu-239 | 8.5 |

TABLE 2-continued

| Nuclide | Composition (wt %) |
| --- | --- |
| Pu-240 | 39.1 |
| Pu-241 | 4.5 |
| Pu-242 | 26.0 |
| Am-241 | 4.5 |
| Am-242M | 0.2 |
| Am-243 | 4.8 |
| Cm-244 | 4.5 |
| Cm-245 | 1.4 |
| Cm-246 | 1.1 |
| Cm-247 | 0.2 |
| Cm-248 | 0.3 |

Figure 20:
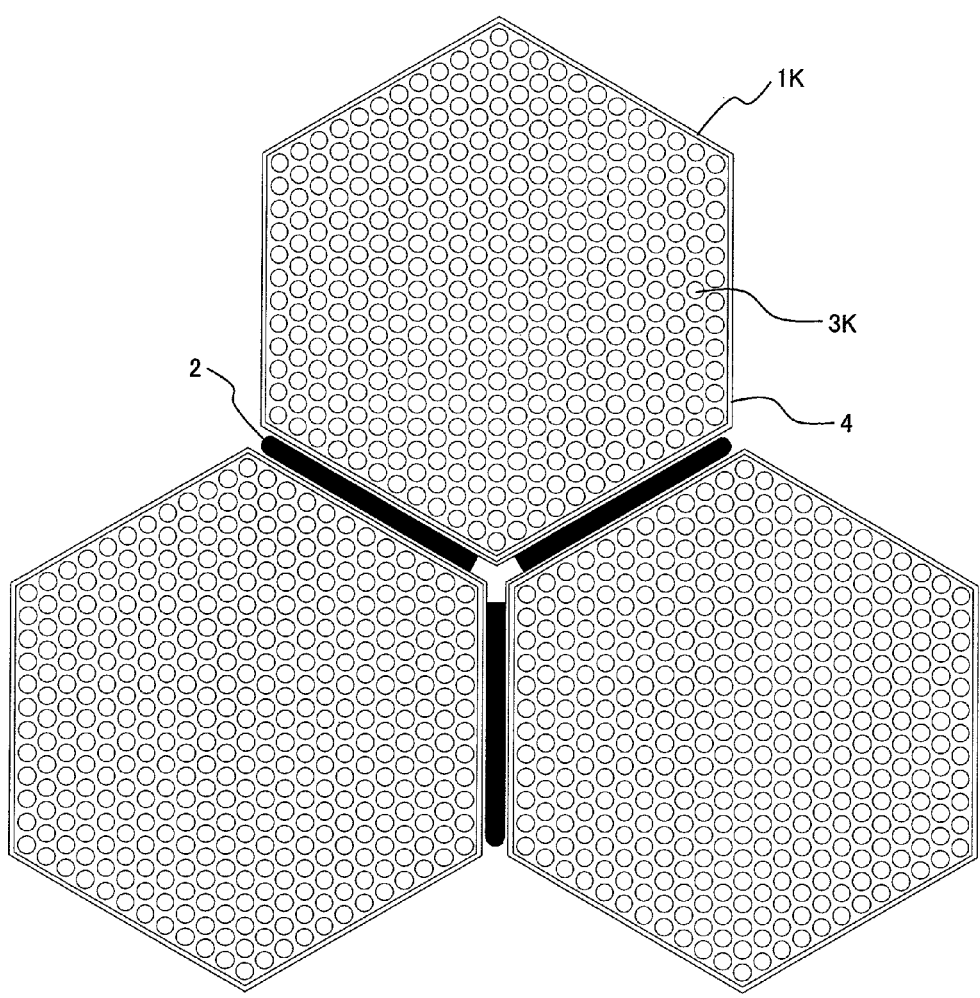
FIG. 20 is a transverse sectional view showing a fuel assembly lattice in a core of a light water reactor according to embodiment 2, which is another embodiment of the present invention.
Figure 21:
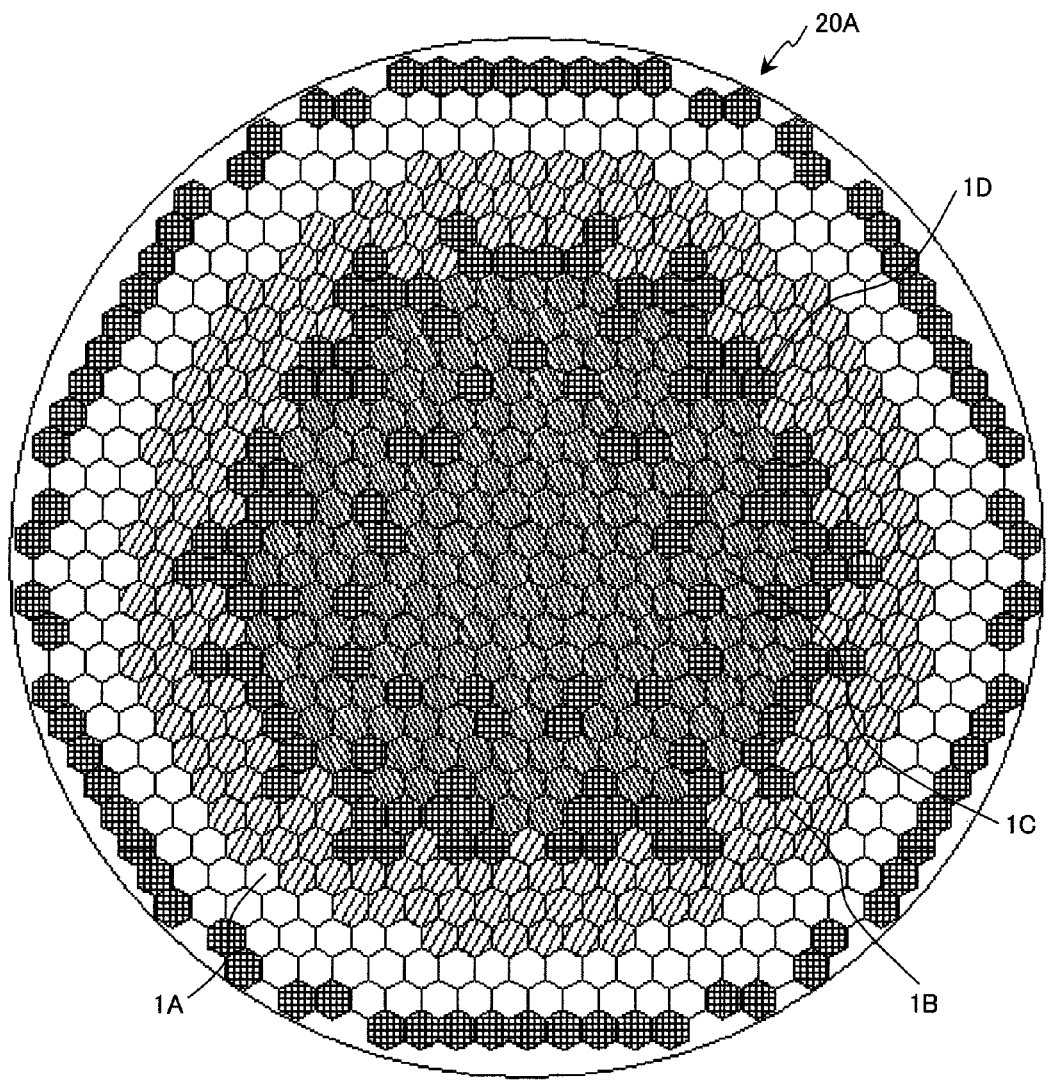
FIG. 21 is an explanatory drawing showing an arrangement of fuel assemblies in an equilibrium core of a light water reactor in embodiment 2.
Figure 22:
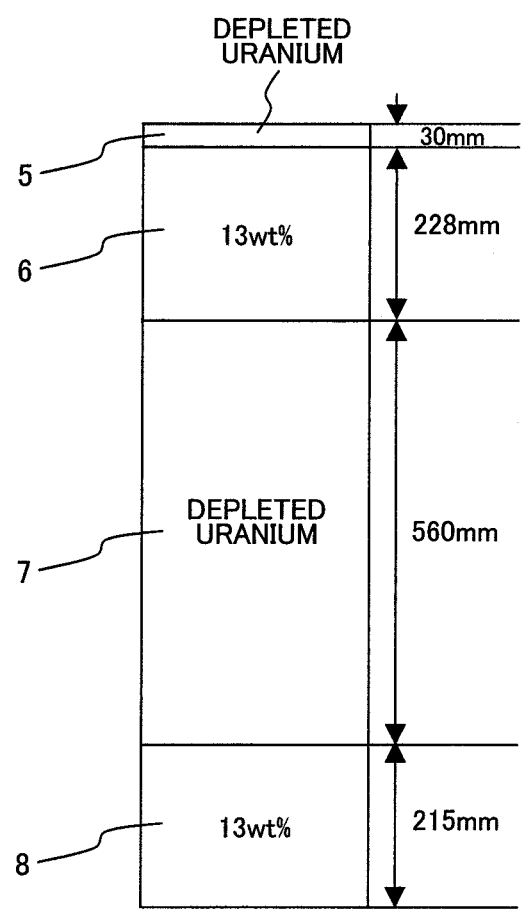
FIG. 22 is an explanatory drawing showing a fissile Pu enrichment distribution in an axial direction in a new fuel assembly to be loaded into the core, which is an equilibrium core, shown in FIG. 21.

A core 20A of a light water reactor in the present embodiment has a structure in which the fuel assembly 1 in the embodiment 1 is replaced with a fuel assembly 1K shown in FIGS. 20 and 22, and other components are the same as in the embodiment 1. In the present embodiment, only components different from the embodiment 1 are described, and the descriptions of the same components as in the embodiment 1 are omitted. The core 20A is also a parfait-type core. The light water reactor to which the core 20A is applied is a BWR 19 shown in FIG. 11, in which the core 20 is replaced with the core 20A. This BWR 19 to which the core 20A is applied, has the same structure, except for the core 20, as the BWR 19 to which the core of the embodiment 1 is applied. The core 20A is a core to be applied to a TRU disappearance reactor.

In the fuel assembly 1K (see FIG. 20) disposed in the core 20A, 397 fuel rods 3K, each having a diameter of 7.2 mm, are disposed in a regular triangle lattice in a channel box 4. A gap between the fuel rods 3K is 2.2 mm, and 11 fuel rods 3K are disposed in a fuel rod row in an outermost peripheral layer. As shown in FIG. 21, fuel assemblies 1A to 1D which have experienced a different number of operation cycles are disposed in the core 20A in the state of being an equilibrium core. The fuel assemblies 1D, the operation cycle of which is the fourth cycle, are disposed in the outermost peripheral region of the core. The fuel assemblies 1A, the operation cycle of which is the first cycle, are disposed in a core outer region, and the fuel assemblies 1B, 1C, and 1D, the operation cycles of which are respectively the second cycle, third cycle, and fourth cycle, are dispersedly disposed in a core inner region. There is an intermediate region between the core inner region and the core outer region, in which intermediate region, a plurality of fuel assemblies 1B is disposed in an annular shape. In such core 20A, the power distribution in the radial direction is more flattened. Each of the fuel assemblies 1A to 1D shown in FIG. 21 is a fuel assembly 1K.

The fuel assembly 1K has a structure in which the lower blanket is removed from the fuel assembly 1 (see FIG. 22), thus its active fuel length portion is divided into four zones. An upper blanket zone 5 is 30 mm high, an upper fissile zone 6 is 228 mm high, an inner blanket zone 7 is 560 mm high, and a lower fissile zone 8 is 215 mm high. When the fuel assembly 1K is a new fuel assembly with a burnup of 0, the two blanket zones are filled with depleted uranium oxide pellets and the upper fissile zone 6 and the lower fissile zone 8 are filled with TRU oxide fuel in all the fuel rods 3K in the fuel assembly 1K. The enrichment of the fissile Pu in this TRU oxide fuel is 13.0 wt %. The TRU for the fuel assembly 1K can be obtained by reprocessing nuclear fuel material in a spent fuel assembly. Neither blanket zone is filled with the mixed oxide fuel. Each TRU fuel in the upper fissile zone 6 and the lower fissile zone 8 contains TRU with the composition shown in Table 2. When the fuel assembly 1K has a burnup of 0, the ratio of Pu-239 in all the TRU is 8.5 wt %. In the core 20A, an upper blanket zone 5A formed by the upper blanket zones 5, an upper fissile zone 6A formed by the upper fissile zones 6, an inner blanket zone 7A formed by the inner blanket zones 7, and a lower fissile zone 8A formed by the lower fissile zones 8 are sequentially disposed from the upper end to the lower end. In the core 20A, the lower end of the lower fissile zone 8A matches the lower end of the core 20A, and no lower blanket zone is formed.

In the present embodiment, as in FIG. 14 of the embodiment 1, a safety rod, which is a control rod 2 being completely withdrawn during the rated power operation of the BWR 19, is withdrawn from the core 20A such that the upper end of a neutron absorber filling-zone 15 filled with $B_4C$ is positioned at the lower end of an active fuel length of the fuel rod 3K. The control rod 2 is provided, above the neutron absorber filling-zone 15, with a follower portion 16 composed of carbon which is a material having smaller moderating power than light water.

According to the present embodiment in which the height of the upper blanket zone is 30 mm, which is no more than 100 mm, the lower end of the lower fissile zone matches the lower end of the core 20A, and no lower blanket zone is provided, the upper end of the neutron absorber filling-zone 15 of each of the plurality of safety rods being completely withdrawn is positioned at the lower end of the active fuel length 14 of the fuel rod 3, that is, the lower end of the lower fissile zone 8A (see FIG. 14); thus upon the occurrence of a compound event beyond design standards such as the core flow rate suddenly dropping for some reason and all the control rods being inoperable during the operation of to the BWR 19, which is a TRU disappearance reactor, the void fraction in the core 20A rapidly rises, the boiling start point of the coolant being slightly sub-cooled and flowing from below the core 20A, shifts to the lower end side of the core 20A, and the power distribution in the axial direction of the core 20 shifts to the lower end side of the core. Therefore, $B_4C$ in each neutron absorber filling-zone 15 whose upper end is positioned at the lower end of the lower fissile zone 8A can absorb excess neutrons shifting to the lower end side of the core. As a result, power can be automatically reduced to the power at which the fuel assemblies 1 can be cooled by the capacity of the coolant suppliable to the core 20A from an emergency high-pressure core flooder 32. Even with the occurrence of a compound event beyond design standards, a sufficient safety potential can be maintained in the TRU disappearance reactor. The present embodiment such as this can improve the safety margin without sacrificing the economic efficiency of the TRU disappearance reactor, which is a light water reactor, even with the occurrence of the above compound event.

The present embodiment can further improve the safety margin of the core upon the occurrence of the above compound event since it has the upper blanket zone 5A and the height of the upper fissile zone 6A is 13 mm, which is more than 10 mm, higher than that of the lower fissile zone 8A.

The height of the upper blanket zone 5 is set to 30 mm and the height of the upper fissile zone 6 is set to 13 mm higher than the height of the lower fissile zone 8 so that when the upper end of the neutron absorber filling-zone 15 of the safety rod being completely withdrawn during the operation of the BWR 19 is positioned at the lower end of the active fuel length of the fuel rod 3 (the lower end of the lower fissile zone 8A), a decrease in core reactivity can be prevented to as well as an impact to the void coefficient can be kept to a minimum.

According to the present embodiment in which the height of the upper blanket zone is 30 mm, which is no more than 100 mm, the lower end of the lower fissile zone matches the lower end of the core 20A, and no lower blanket zone is provided, all the restrictive conditions can be met and at the same time, even upon the occurrence of a composite event beyond design standards such as the core flow rate substantially dropping for some reason and all the control rods being inoperable, power can be automatically reduced to the power at which the fuel assemblies can be cooled by the capacity of the coolant suppliable to the core 20A from the emergency high-pressure core flooder 32 (see FIG. 10). For this reason, even with the occurrence of such a compound event, the safety margin of the core 20A can be improved. The core 20A can reduce the amount of TRU included in the fuel assembly 1K to less than that of when the burnup of the fuel assembly is 0.

In the BWR 19 to which the core 20A is applied, generating the same electric power of 1350 MW as a current ABWR using the reactor pressure vessel of approximately the same size as that in the ABWR, a discharge burnup of 65 GWd/t for the core 20A can be obtained. According to the present embodiment, MCPR is 1.3 and the void coefficient is $-4 \times 10^{-4}$ $\Delta k/k/\%$ void, the absolute value of which is one digit higher than the void coefficient of $-2 \times 10^{-5}$ $\Delta k/k/\%$ void in the TRU disappearance reactor stated in R. TAKEDA et al., Proc. of International Conference on Advanced Nuclear Fuel Cycles and Systems. GLOBAL '07 Boise, USA, September, 2007, P. 1725. Furthermore, according to the present embodiment, TRU can be decreased while the ratios of TRU isotopes are maintained.

In the present embodiment, as in the embodiment 1, the same effect can be obtained by disposing pellets 21 including a neutron absorbing material such as boron, gadolinia, Dy, Sm, Eu, etc. below the active fuel length 14 of each fuel rod 3 included in each fuel assembly (see FIG. 19) instead of positioning the upper end of the neutron absorber filling-zone 15 of the safety rod being completely withdrawn, at the lower end of the active fuel length 14 of the fuel rod 3 (the lower end of the lower fissile zone 8A) (see FIG. 14).

Embodiment 3

Figure 23:
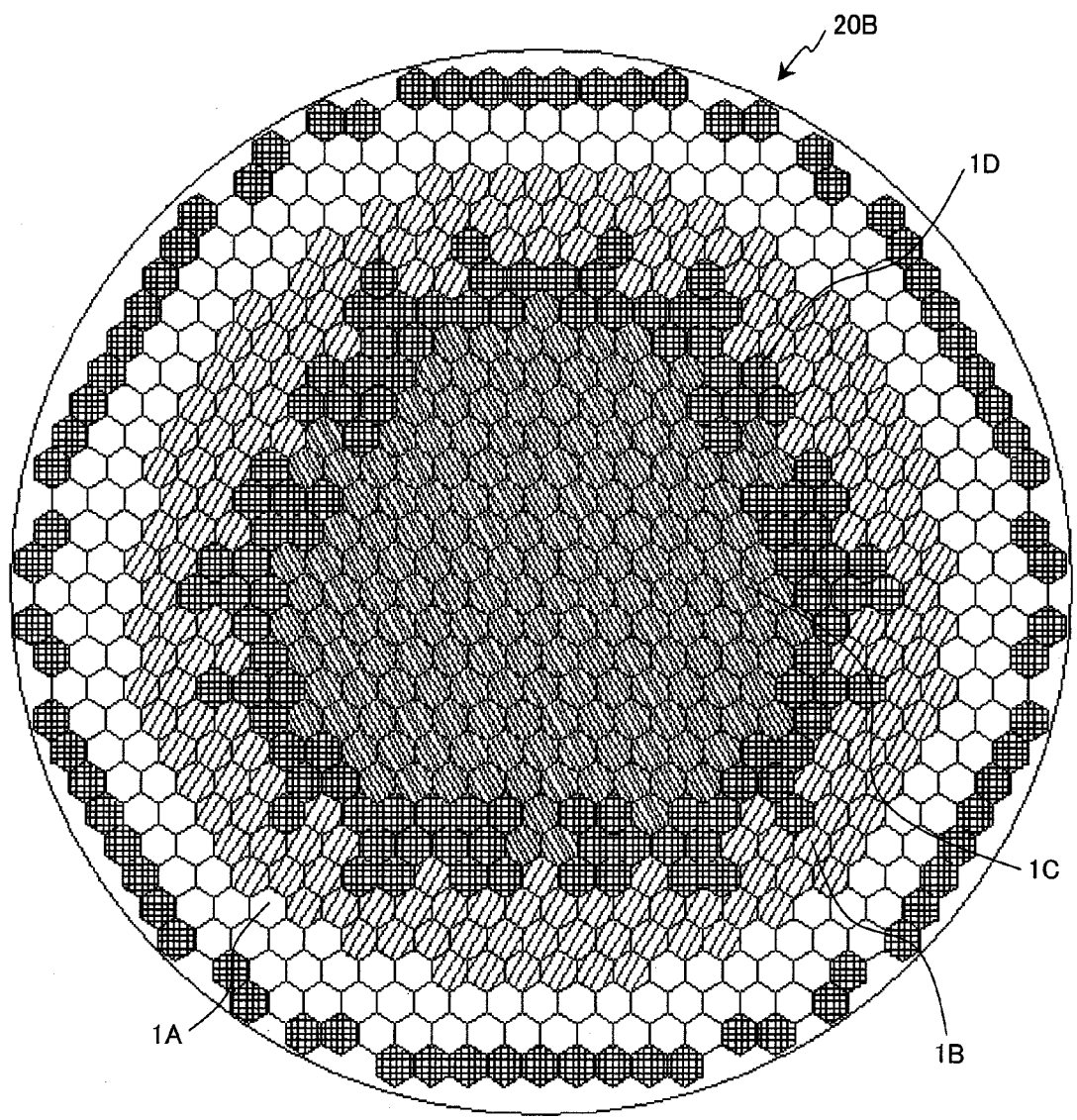
FIG. 23 is a transverse sectional view showing a core of a light water reactor according to embodiment 3, which is another embodiment of the present invention.

A core of a light water reactor according to embodiment 3, which is another embodiment of the present invention, is described below in detail with reference to FIGS. 23 to 25 and Table 3.

TABLE 3

| Nuclide | Composition (wt %) |
|---------|--------------------|
| Np-237  | 0.2                |
| Pu-238  | 5.0                |
| Pu-239  | 13.4               |
| Pu-240  | 40.8               |
| Pu-241  | 4.6                |
| Pu-242  | 21.1               |
| Am-241  | 4.7                |
| Am-242M | 0.2                |
| Am-243  | 4.1                |
| Cm-244  | 3.6                |
| Cm-245  | 1.1                |
| Cm-246  | 0.8                |
| Cm-247  | 0.2                |
| Cm-248  | 0.2                |

Figure 24:
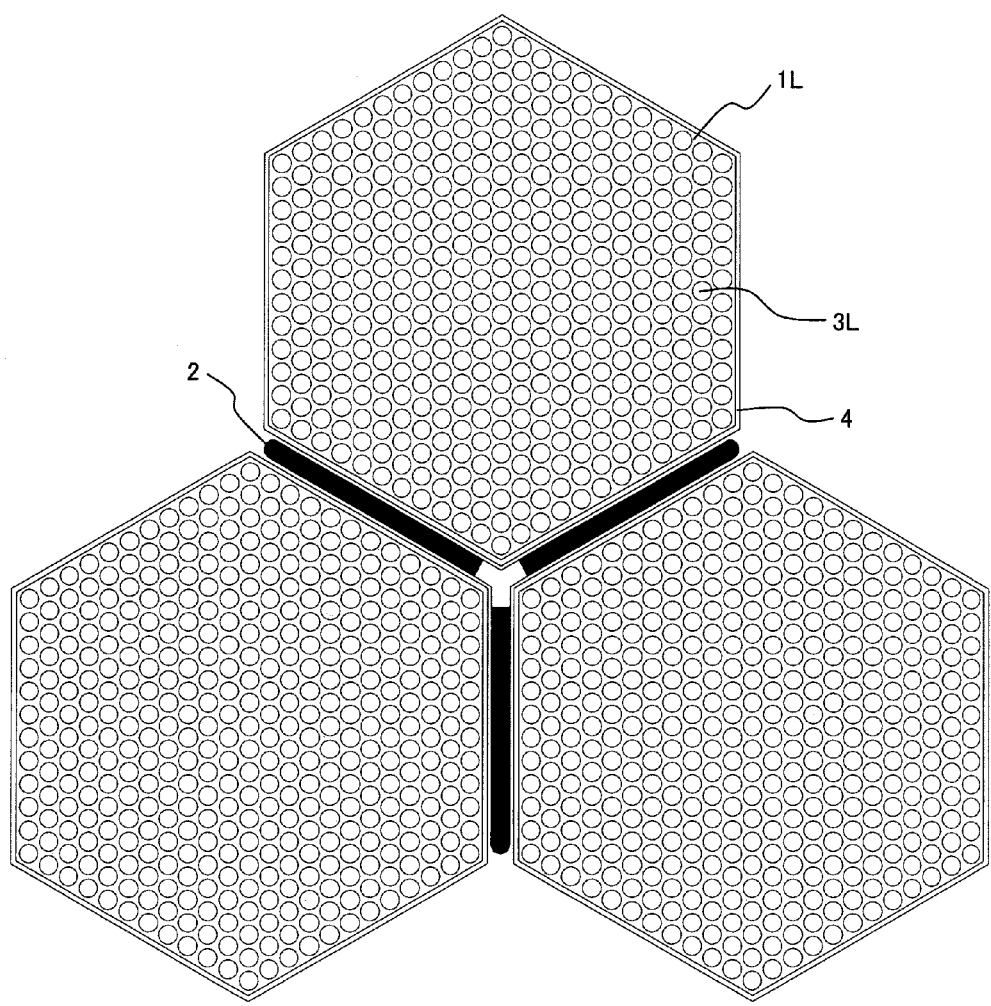
FIG. 24 is a transverse sectional view showing a fuel assembly lattice shown in FIG. 23.
Figure 25:
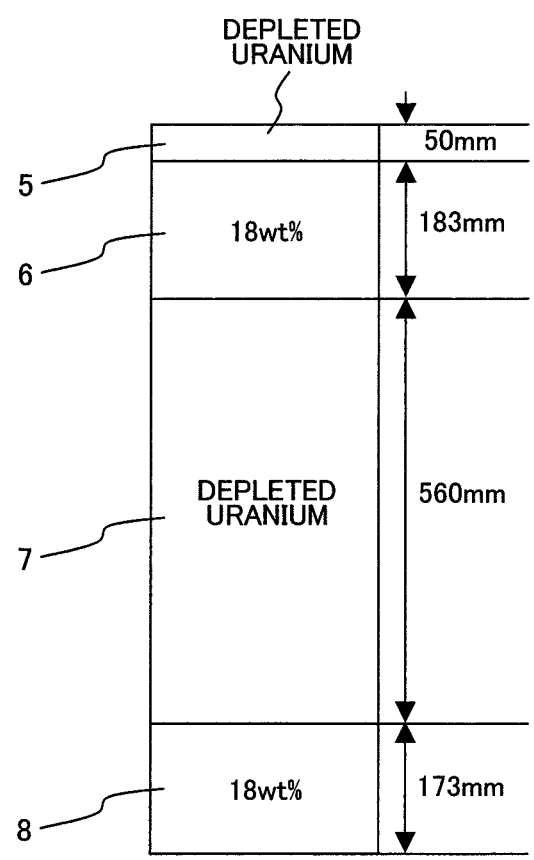
FIG. 25 is an explanatory drawing showing a fissile Pu enrichment distribution in an axial direction in a new fuel assembly to be loaded into the equilibrium core, which is an equilibrium core, shown in FIG. 24.

A core 20B of a light water reactor in the present embodiment has a structure in which the fuel assemblies 1K in the core 20A in the embodiment 2 are replaced with fuel assemblies 1L described in FIGS. 24 and 25, and other components are the same as in the embodiment 2. The light water reactor to which the core 20B is applied is a BWR 19 shown in FIG. 11, in which the core 20 is replaced with the core 20B. This BWR 19 to which the core 20B is applied, has the same components, except for the core 20, as the BWR 19 to which the core of the embodiment 1 is applied. The core 20B is a core applied to a TRU disappearance reactor. The components of the present embodiment which are different from the embodiment 2 are described, and the descriptions of the components that are the same as the embodiment 2 are omitted.

In the fuel assembly 1L used in the present embodiment (see FIG. 24), 397 fuel rods 3L, each having a diameter of 7.6 mm, are disposed in a regular triangle lattice in a channel box 4. A gap between the fuel rods 3L is 1.8 mm, and 11 fuel rods 3L are disposed in a fuel rod row in an outermost peripheral layer. As shown in FIG. 23, fuel assemblies 1A to 1D which have experienced a different number of operation cycles are disposed in the core 20B in the state of being an equilibrium core. The fuel assemblies 1D, the operation cycle of which is the fourth cycle, are disposed in the outermost peripheral region of the core. The fuel assemblies 1A, the operation cycle of which is the first cycle, are disposed in a core outer region, and the fuel assemblies 1B, 1C, and 1D, the to operation cycles of which are respectively the second cycle, third cycle, and fourth cycle, are dispersedly disposed in a core inner region. There is an intermediate region between the core inner region and the core outer region, in which intermediate region, a plurality of the fuel assemblies 1B is disposed in an annular shape. In such core 20B, the power distribution in the radial direction is more flattened. Each of the fuel assemblies 1A to 1D shown in FIG. 23 is a fuel assembly 1L.

In the fuel assembly 1L, as in the fuel assembly 1K, its active fuel length portion is divided into four zones (see FIG. 25). An upper blanket zone 5 is 50 mm high, an upper fissile zone 6 is 183 mm high, an inner blanket zone 7 is 560 mm high, and a lower fissile zone 8 is 173 mm high. When the fuel assembly 1L is a new fuel assembly with a burnup of 0, the two blanket zones are filled with depleted uranium oxide pellets and the upper fissile zone 6 and the lower fissile zone 8 are filled with TRU oxide fuel in all the fuel rods 3L in the fuel assembly 1L. The enrichment of the fissile Pu in this TRU fuel is 18.0 wt %. Neither blanket zone is filled with the mixed oxide fuel. Each TRU oxide fuel in the upper fissile zone 6 and the lower fissile zone 8 contains TRU with the composition shown in Table 3. This TRU is a material obtained by reprocessing nuclear fuel material in a spent fuel assembly. When the fuel assembly 1L has a burnup of 0, the ratio of Pu-239 in all the TRU is 13.4 wt %. In the core 20B as well, an upper blanket zone 5A formed by the upper blanket zones 5, an upper fissile zone 6A formed by the upper fissile zones 6, an inner blanket zone 7A formed by the inner blanket zones 7, and a lower fissile zone 8A formed by the lower fissile zones 8 are sequentially disposed from the upper end of the core 20B to the lower end of the core 20B. In the core 20B, the lower end of the lower fissile zone 8A matches the lower end of the core 20B, and no lower blanket zone is formed.

In the present embodiment, as in FIG. 14 of the embodiment 1, when the BWR 19 is operated at the rated power, the upper end of a neutron absorber filling-zone 15 with each of safety rods (some of control rods 2) being completely withdrawn, is positioned at the lower end of an active fuel length of the fuel rod 3L (the lower end of the lower fissile zone 8A). The Y-shaped control rod 2 is provided, above the neutron absorber filling-zone 15, with a follower portion 16 composed of carbon which is a material having a smaller moderating power than light water.

According to the present embodiment in which the height of the upper blanket zone is 50 mm, which is no more than 100 mm, the lower end of the lower fissile zone matches the lower end of the core 20B, and no lower blanket zone is provided, the upper end of the neutron absorber filling-zone 15 of each safety rod being completely withdrawn, is positioned at the lower end of the active fuel length 14 of the fuel rod 3, that is, the lower end of the lower fissile zone 8A (see FIG. 14); thus upon the occurrence of a compound event beyond design standards such as the core flow rate suddenly dropping for some reason and all the control rods being inoperable during the operation of the BWR 19, which is a TRU disappearance reactor, the void fraction in the core 20B rapidly rises, the boiling start point of the coolant being slightly sub-cooled and flowing from below the core 20B, shifts to the lower end side of the core 20B, and the power distribution in the axial direction of the core shifts to the lower side of the core 20B. Therefore, $B_4C$ in each neutron absorber filling-zone 15 whose upper end is positioned at the lower end of the lower fissile zone 8A can absorb excess neutrons shifting to the lower end side of the core 20B. As a result, power can be automatically reduced to the power at which the fuel assemblies can be cooled by the capacity of the coolant suppliable to the core 20A from an emergency high-pressure core flooder 32. Even with the occurrence of a compound event beyond design standards, a sufficient safety potential can be maintained in the TRU disappearance reactor. The present embodiment such as this can improve the safety margin without sacrificing the economic efficiency of the TRU disappearance reactor even with the occurrence of the above compound event.

The present embodiment can further improve the safety margin of the core upon the occurrence of the above compound event since it has the upper blanket zone and the height of the upper fissile zone is 10 mm higher than that of the lower fissile zone.

The height of the upper blanket zone 5 is set to 50 mm and the height of the upper fissile zone 6 is set to 10 mm higher than the height of the lower fissile zone 8 so that when the upper end of the neutron absorber filling-zone 15 of the safety rod being completely withdrawn during the operation of the BWR 19 is positioned at the lower end of the active fuel length of the fuel rod 3 (the lower end of the lower fissile zone 8A), a decrease in core reactivity can be prevented as well as an impact to the void coefficient can be kept to a minimum.

According to the present embodiment, all the restrictive conditions can be met and at the same time, even upon the occurrence of a composite event beyond design standards such as the core flow rate substantially dropping for some reason and all control rods being inoperable, power can be automatically reduced to the power at which the fuel assemblies can be cooled by the capacity of the coolant suppliable to the core 20B from the emergency high-pressure core flooder 32. For this reason, the safety margin of the core 20B can be improved upon the occurrence of such a compound event. The core 20B can reduce the amount of TRU included in the fuel assembly 1L to less than that of when the burnup of the fuel assembly is 0.

In the BWR 19 to which the core 20B is applied, generating the same electric power of 1350 MW as a current ABWR using a reactor pressure vessel of approximately the same size as that in the ABWR, a discharge burnup of 65 GWd/t can be achieved for the core 20B. According to the present embodiment, the void coefficient is $-6 \times 10^{-4}$ $\Delta k/k/\%$ void and MCPR is 1.3 and TRU can be decreased while the ratios of TRU isotopes are maintained.

Embodiment 4

A core of a light water reactor core according to embodiment 4, which is another embodiment of the present invention, is described below in detail with reference to FIGS. 26, 27, and Table 4.

TABLE 4

| Nuclide | Composition (wt %) |
| --- | --- |
| Np-237 | 0.2 |
| Pu-238 | 4.9 |
| Pu-239 | 7.0 |
| Pu-240 | 35.2 |
| Pu-241 | 4.6 |
| Pu-242 | 29.4 |
| Am-241 | 3.9 |
| Am-242M | 0.2 |
| Am-243 | 5.2 |
| Cm-244 | 5.7 |
| Cm-245 | 1.6 |
| Cm-246 | 1.5 |
| Cm-247 | 0.3 |
| Cm-248 | 0.3 |

Figure 26:
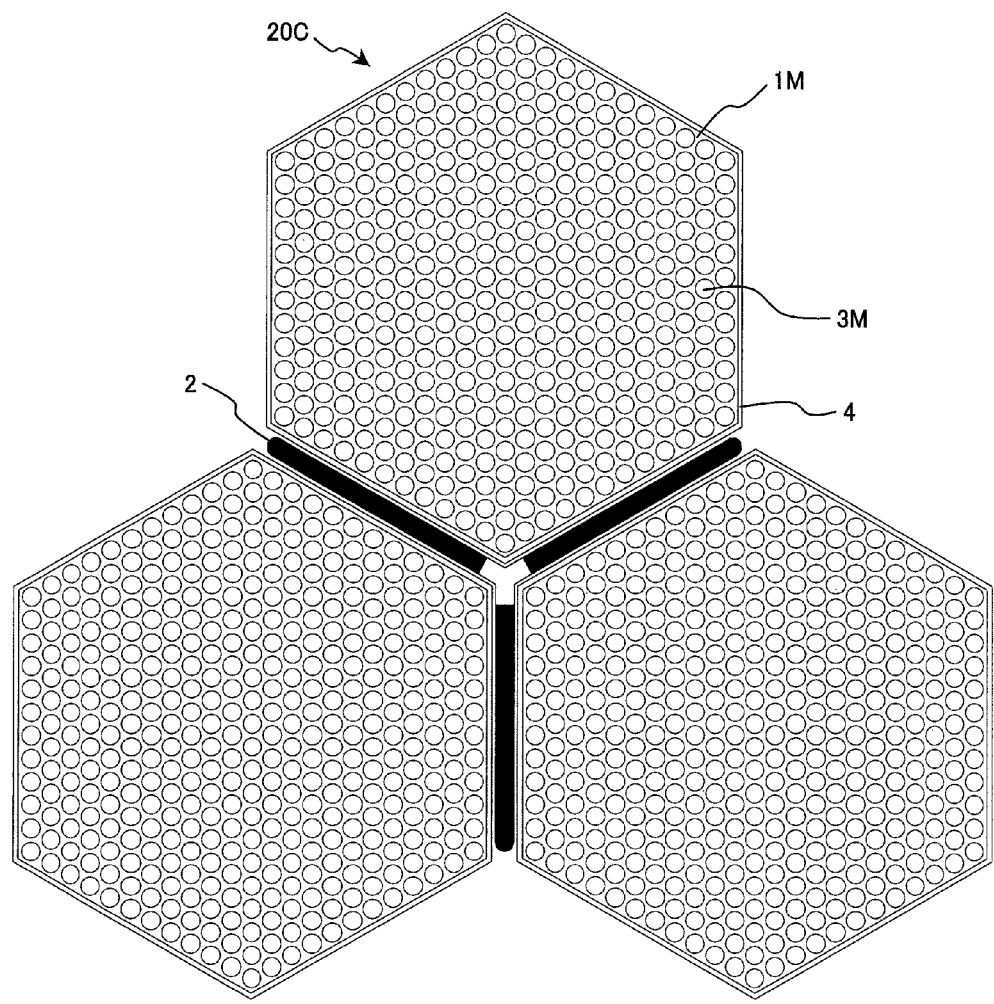
FIG. 26 is a transverse sectional view showing a fuel assembly lattice in a core of a light water reactor according to embodiment 4, which is another embodiment of the present invention.
Figure 27:
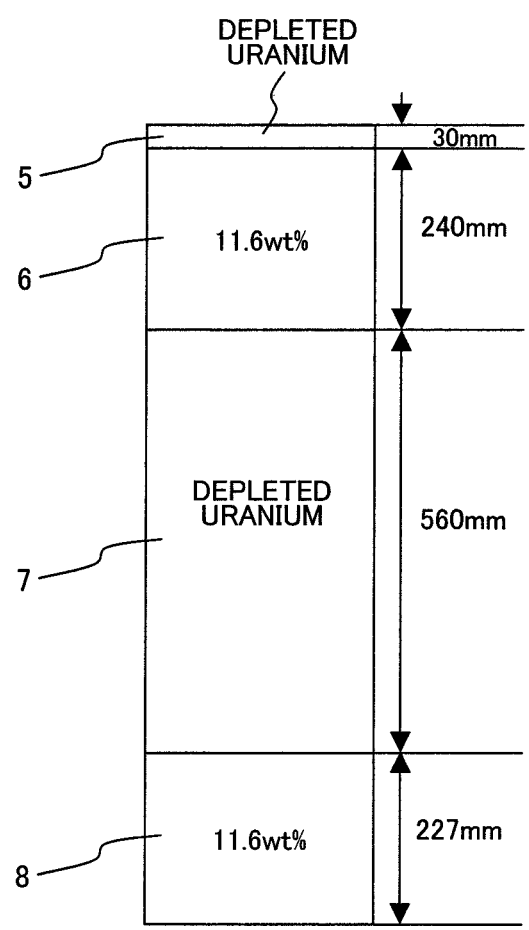
FIG. 27 is an explanatory drawing showing a fissile Pu enrichment distribution in an axial direction in a new fuel assembly to be loaded into the equilibrium core, which is an equilibrium core, shown in FIG. 26.

A core 20C of a light water reactor in the present embodiment has a structure in which the fuel assemblies 1K in the core 20A in the embodiment 2 are replaced with fuel assemblies 1M shown in FIGS. 26 and 27, and other components are the same as in the embodiment 2. The light water reactor to which the core 20C is applied is a BWR 19 shown in FIG. 11, in which the core 20 is replaced with the core 20C. This BWR 19 to which the core 20C is applied, has the same components, except for the core 20, as the BWR 19 to which the core of the embodiment 1 is applied. The core 20C is a core applied to a TRU disappearance reactor. The components of the present embodiment which are different from the embodiment 2 are described, and the descriptions of the components that are the same as the embodiment 2 are omitted.

In the fuel assembly 1M used in the present embodiment (see FIG. 26), 397 fuel rods 3M, each having a diameter of 7.1 mm, are disposed in a regular triangle lattice in a channel box 4. A gap between the fuel rods 3M is 2.3 mm, and 11 fuel rods 3M are disposed in a fuel rod row in an outermost peripheral layer. The arrangement of the fuel assemblies in an equilibrium core in the present embodiment is the same as that shown in FIG. 21 in the embodiment 2.

In the fuel assembly 1M, as in the fuel assembly 1K, its active fuel length portion is divided into four zones (see FIG. 27). An upper blanket zone 5 is 30 mm high, an upper fissile zone 6 is 240 mm high, an inner blanket zone 7 is 560 mm high, and a lower fissile zone 8 is 227 mm high. When the fuel assembly 1M is a new fuel assembly with a burnup of 0, the two blanket zones are filled with depleted uranium oxide pellets and the upper fissile zone 6 and the lower fissile zone 8 are filled with TRU oxide fuel in all the fuel rods 3M in the fuel assembly 1M. The enrichment of the fissile Pu in this TRU fuel is 11.6 wt %. Neither blanket zone is filled with the mixed oxide fuel. Each TRU fuel in the upper fissile zone 6 and the lower fissile zone 8 contains TRU with the composition shown in Table 4. This TRU is a material obtained by reprocessing nuclear fuel material in a spent fuel assembly. When the fuel assembly 1M is a new fuel assembly, the ratio of Pu-239 in all the TRU is 7.0 wt %. In the core 20C as well, an upper blanket zone 5A formed by the upper blanket zones 5, an upper fissile zone 6A formed by the upper fissile zones 6; an inner blanket zone 7A formed by the inner blanket zones 7, and a lower fissile zone 8A formed by the lower fissile zones 8 are sequentially disposed from the upper end of the core 20C to the lower end of the core 20C. In the core 20C, the lower end of the lower fissile zone 8A matches the lower end of the core 20C, and no lower blanket zone is formed.

In the present embodiment, as in FIG. 14 of the embodiment 1, when the BWR 19 is operated at the rated power, the upper end of a neutron absorber filling-zone 15 of each the safety rods (some of Y-shaped control rods 2) being completely withdrawn, is positioned at the lower end of the active fuel length of the fuel rod 3M (the lower end of the lower fissile zone 8A). The control rod 2 is provided, above the neutron absorber filling-zone 15, with a follower portion 16 composed of carbon which is a material having a smaller moderating power than light water.

According to the present embodiment in which the height of the upper blanket zone is 30 mm, which is no more than 100 mm, the lower end of the lower fissile zone matches the lower end of the core 20C, and no lower blanket zone is provided, the upper end of the neutron absorber filling-zone 15 of each safety rod being completely withdrawn, is positioned at the lower end of the active fuel length 14 of the fuel rod 3, that is, the lower end of the lower fissile zone 8A (see FIG. 14); thus upon the occurrence of a compound event beyond design standards such as the core flow rate suddenly dropping for some reason and all the control rods being inoperable during the operation of the BWR 19, which is a TRU disappearance reactor, the void fraction in the core 20C rapidly rises, the boiling start point of the coolant being slightly sub-cooled and flowing from below the core 20C, shifts to the lower end side of the core 20C, and the power distribution in the axial direction of the core shifts to the lower side of the core 20C. Therefore, $B_4C$ in each neutron absorber filling-zone 15 whose upper end is positioned at the lower end of the lower fissile zone 8A can absorb excess neutrons shifting to the lower side of the core 20C. As a result, power can be automatically reduced to the power at which the fuel assemblies can be cooled by the capacity of the coolant suppliable to the core 20C from an emergency high-pressure core flooder 32. Even with the occurrence of a compound event beyond design standards, a sufficient safety potential can be maintained in the TRU disappearance reactor. The present embodiment such as this can improve the safety margin without sacrificing the economic efficiency of the TRU disappearance reactor even with the occurrence of the above compound event.

The present embodiment can further improve the safety margin of the core upon the occurrence of the above compound event since it has the upper blanket zone and the height of the upper fissile zone is 13 mm, which is more than 10 mm, higher than that of the lower fissile zone.

The height of the upper blanket zone 5 is set to 30 mm and the height of the upper fissile zone 6 is set to 13 mm higher than the height of the lower fissile zone 8 so that when the upper end of the neutron absorber filling-zone 15 of the safety rod being completely withdrawn during the operation of the BWR 19 is positioned at the lower end of the active fuel length of the fuel rod 3 (the lower end of the lower fissile zone 8A), a decrease in core reactivity can be prevented as well as an impact to the void coefficient can be kept to a minimum.

According to the present embodiment, all the restrictive conditions can be met and at the same time, even upon the occurrence of a composite event beyond design standards such as the core flow rate substantially dropping for some reason and all the control rods being inoperable, power can be automatically reduced to the power at which the fuel assemblies can be cooled by the capacity of the coolant suppliable to the core 20C from the emergency high-pressure core flooder 32. For this reason, the safety margin of the core 20C can be improved even with the occurrence of such a compound event. The core 20C can reduce the amount of TRU included in the fuel assembly 1M to less than that of when a burnup of the fuel assembly is 0.

In the BWR 19 to which the core 20C is applied, generating the same electric power of 1350 MW as a current ABWR using a reactor pressure vessel of approximately the same size as that in the ABWR, a discharge burnup of 65 GWd/t can be achieved. In the present embodiment, the void coefficient is $-3 \times 10^{-4}$ Δk/k/% void and MCPR is 1.3 and TRU can be decreased while the ratios of TRU isotopes are maintained.

Embodiment 5

A core of a light water reactor core according to embodiment 5, which is another embodiment of the present invention, is described below in detail with reference to FIG. 28. In the light water reactor core of the present embodiment, each fuel assembly 1 loaded to the core 20 in the embodiment 1 is structured as shown in FIG. 28, and other components are the same as in the embodiment 1.

Figure 28:
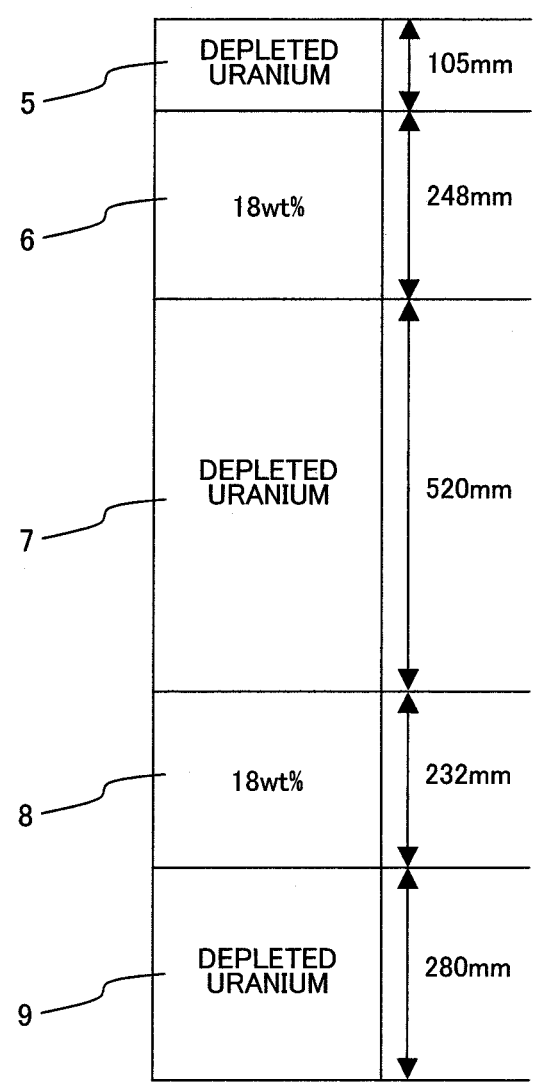
FIG. 28 is an explanatory drawing showing a fissile Pu enrichment distribution in an axial direction in a new fuel assembly to be loaded into an equilibrium core of a light water reactor in embodiment 5, which is another embodiment of the present invention.

In an active fuel length portion of the fuel assembly, as shown in FIG. 28, five zones, i.e., an upper blanket zone 5, an upper fissile zone 6, an inner blanket zone 7, a lower fissile zone 8, and a lower blanket zone 9 are sequentially formed from the upper end to the lower end. The height of each zone is as follows: the upper blanket zone 5 is 105 mm high; the upper fissile zone 6 is 248 mm high; the inner blanket zone 7 is 520 mm high; the lower fissile zone 8 is 232 mm high; and the lower blanket zone 9 is 280 mm high. In the core 20 loaded with a plurality of fuel assemblies 1 forming each zone shown in FIG. 28, an upper blanket zone 5A formed by the upper blanket zones 5, an upper fissile zone 6A formed by the upper fissile zones 6, an inner blanket zone 7A formed by the inner blanket zones 7, a lower fissile zone 8A formed by the lower fissile zones 8, and a lower blanket zone 9A formed by the lower blanket zones 9 are sequentially disposed from the upper end to the lower end.

Each effect generated by the embodiment 1 can be obtained by the core of the present embodiment.

In the present embodiment, which considers safety within the design standards only, a higher burnup can be achieved than in the embodiment 1, and in the BWR 19 to which the core of the present embodiment is applied, generating the same electric power of 1350 MW as a current ABWR using a reactor pressure vessel of approximately the same size as that in the ABWR, a discharge burnup of 66 GWd/t for the core zone and a discharge burnup of 55 GWd/t for the core including the upper and lower blanket zones can be achieved. In the present embodiment, the void coefficient is $-5 \times 10^{-5}$ Δk/k/% void and MCPR is 1.3, and a breeding ratio of 1.01 can be achieved while the ratios of TRU isotopes are maintained practically constant as described above.

Embodiment 6

A core of a light water reactor core according to embodiment 6, which is another embodiment of the present invention, is described below in detail with reference to FIGS. 29 and 30.

Figure 29:
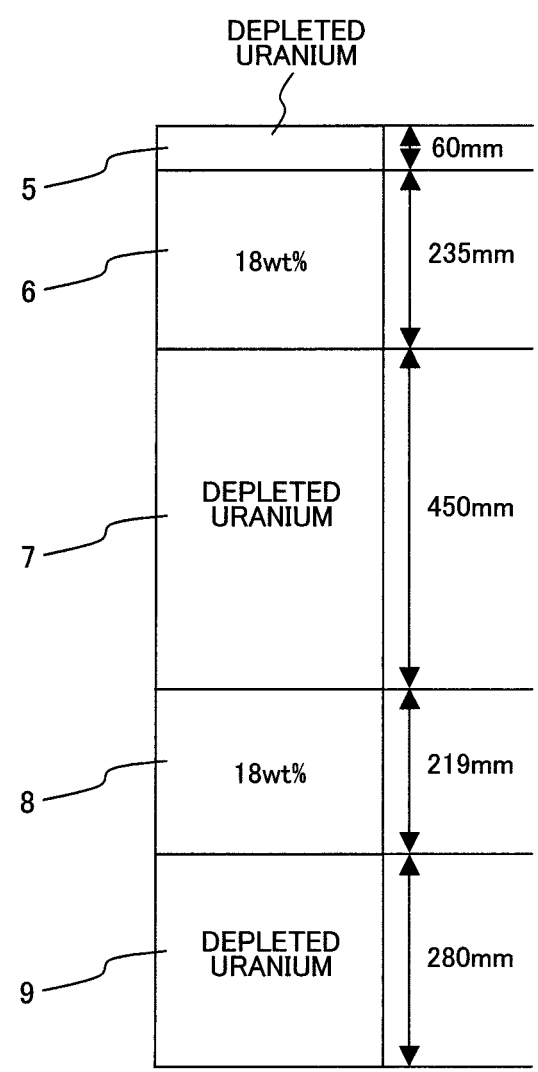
FIG. 29 is an explanatory drawing showing a fissile Pu enrichment distribution in an axial direction in a new fuel assembly to be loaded into an equilibrium core of a light water reactor in embodiment 6, which is another embodiment of the present invention.
Figure 30:
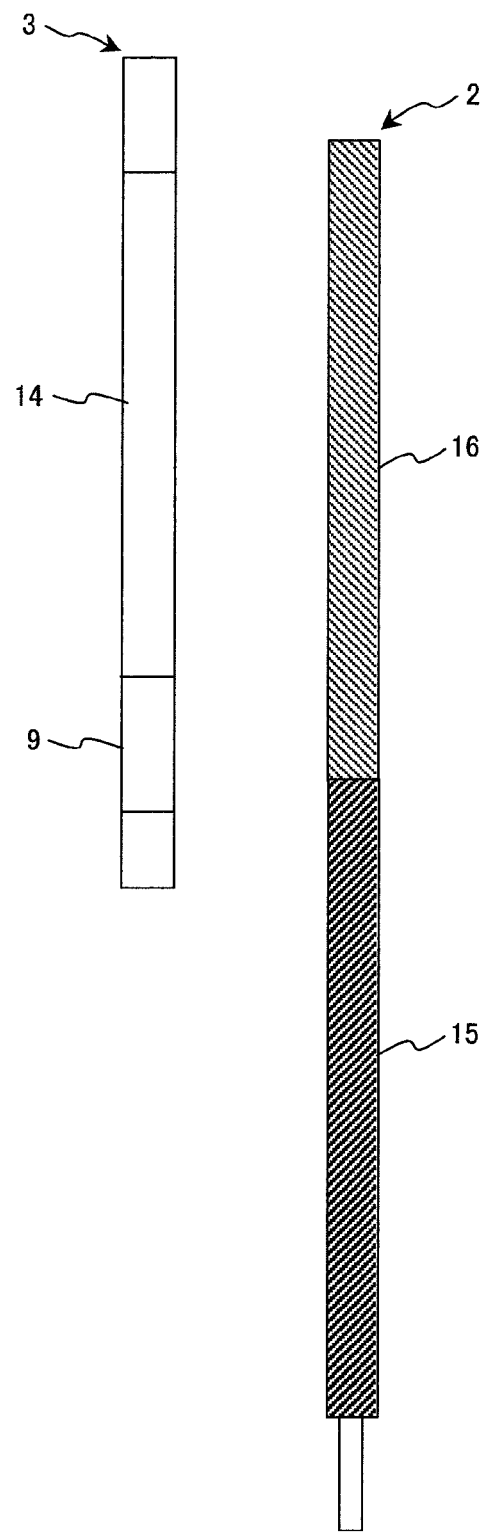
FIG. 30 is an explanatory drawing showing a positional relationship in a height direction between a fuel rod and a Y-shaped control rod in the fuel assembly in embodiment 6, which is another embodiment of the present invention.

In the core of the present embodiment, each fuel assembly 1 loaded to the core 20 in the embodiment 1 is structured as shown in FIG. 29, and other components are the same as in the embodiment 1. In the present embodiment, when the light water reactor to which the core of the present embodiment is applied, is operated at the rated power, the upper end of a neutron absorber filling-zone 15 of each of the safety rods (some of Y-shaped control rods 2) being completely withdrawn, is positioned at ⅕ the height of a lower blanket zone 9 from the lower end of the lower blanket zone 9 (see FIG. 30).

In an active fuel length portion of this fuel assembly, as shown in FIG. 29, five zones, i.e., an upper blanket zone 5, an upper fissile zone 6, an inner blanket zone 7, a lower fissile zone 8, and the lower blanket zone 9 are sequentially formed from the upper end to the lower end. The height of each zone is as follows: the upper blanket zone 5 is 60 mm high; the upper fissile zone 6 is 235 mm high; the inner blanket zone 7 is 450 mm high; the lower fissile zone 8 is 219 mm high; and the lower blanket zone 9 is 280 mm high. In the core of the present embodiment, as in the core 20, an upper blanket zone 5A, an upper fissile zone 6A, an inner blanket zone 7A, a lower fissile zone 8A, and a lower blanket zone 9A are formed at the same axial positions as the upper blanket zone 5, the upper fissile zone 6, the inner blanket zone 7, the lower fissile zone 8, and the lower blanket zone 9 formed in each fuel assembly shown in FIG. 29.

The core of the present embodiment can be obtained each effect generated by the embodiment 1.

In the BWR 19 to which the core of the present embodiment is applied, generating the same electric power of 1350 MW as a current ABWR using a reactor pressure vessel 27 of approximately the same size as that in the ABWR, a discharge burnup of 54 GWd/t for the core zone and a discharge burnup of 45 GWd/t for the core 20 including the upper and lower blanket zones can be achieved. In addition, in the present embodiment, the void coefficient is $-3 \times 10^{-4}$ Δk/k/% void and MCPR is 1.3, and a breeding ratio of 1.01 can be achieved while the ratios of TRU isotopes are maintained practically constant as described above.

What is claimed is:

1. A core of a light water reactor having a plurality of fuel assemblies, which are loaded in said core, having nuclear fuel material containing a plurality of isotopes of transuranium nuclides, an upper blanket zone, and a fissile zone, in which said transuranium nuclides are contained, disposed below said upper blanket zone;
    wherein a ratio of Pu-239 in all said transuranium nuclides contained in said fuel assembly is in a range of 5% or more but less than 40% when burnup of said fuel assembly is 0;
    an axial length of said upper blanket zone is in a range of 20 to 100 mm; and
    a lower end of said fissile zone in an axial direction substantially delimits a lower end of said core in the axial direction;
    wherein the lower end of said fissile zone substantially delimits the lower end of said core without a lower blanket zone between the lower end of the fissile zone and the lower end of the core.

2. The core of the light water reactor according to claim 1, wherein said core has an inner blanket zone between said upper blanket zone and said lower end of said core;
    said fissile zone includes an upper fissile zone containing said transuranium nuclides and disposed between said upper blanket zone and said inner blanket zone, and a lower fissile zone containing said transuranium nuclides and disposed between said inner blanket zone and said lower end of said core; and
    an axial length of said upper fissile zone is larger than an axial length of said lower fissile zone within a range of 10 to 25 mm.

3. The core of the light water reactor according to claim 1, wherein an upper end of a neutron absorber zone of a safety rod provided in said light water reactor is positioned between the lower end of the core and a position which is 5 mm below the lower end of the core.

4. A fuel assembly having nuclear fuel material containing a plurality of isotopes of transuranium nuclides, an upper blanket zone, and a fissile zone containing said transuranium nuclides and disposed below said upper blanket zone;

wherein a ratio of Pu-239 in all said transuranium nuclides contained in said nuclear fuel material is in a range of 5% or more but less than 40% when burnup of said fuel assembly is 0;

an axial length of said upper blanket zone is in a range of 20 to 100 mm; and a lower end of said fissile zone in an axial direction substantially delimits a lower end of an active fuel length of said fuel assembly in the axial direction;

wherein the lower end of said fissile zone substantially delimits the lower end of the active fuel length of said fuel assembly without a lower blanket zone between the lower end of the fissile zone and the lower end of the active fuel length of said fuel assembly.

5. The fuel assembly according to claim 4, wherein said fuel assembly has an inner blanket zone between said upper blanket zone and a lower end of said active fuel length of said fuel assembly;

said fissile zone includes an upper fissile zone containing said transuranium nuclides and disposed between said upper blanket zone and said inner blanket zone, and a lower fissile zone containing said transuranium nuclides and disposed between said inner blanket zone and said lower end of said active fuel length; and an axial length of said upper fissile zone is larger than an axial length of said lower fissile zone within a range of 10 to 25 mm.

* * * * *

UNITED STATES PATENT AND TRADEMARK OFFICE
CERTIFICATE OF CORRECTION

PATENT NO. : 8,571,166 B2  
APPLICATION NO. : 13/411091  
DATED : October 29, 2013  
INVENTOR(S) : Takeda et al.

Page 1 of 1

It is certified that error appears in the above-identified patent and that said Letters Patent is hereby corrected as shown below:

On the title page insert item --(63)   Related U.S. Application Data

>    Division of application No. 12/537,452, filed on August 7, 2009 now U.S. Patent 8,422,617--

Signed and Sealed this
Eighteenth Day of February, 2014

Michelle K. Lee
*Deputy Director of the United States Patent and Trademark Office*